US008406191B2

(12) United States Patent
Dynarski et al.

(10) Patent No.: US 8,406,191 B2
(45) Date of Patent: Mar. 26, 2013

(54) PSEUDO WIRES FOR MOBILITY MANAGEMENT

(75) Inventors: Rick Dynarski, Freehold, NJ (US);
David R. Mazik, Howell, NJ (US);
Hesham Soliman, Endeavour Hills (AU); Murari Srinivasan, Palo Alto, CA (US)

(73) Assignee: Qualcomm Incorporated, San Diego, CA (US)

( * ) Notice: Subject to any disclaimer, the term of this patent is extended or adjusted under 35 U.S.C. 154(b) by 1374 days.

(21) Appl. No.: 11/486,808

(22) Filed: Jul. 14, 2006

(65) Prior Publication Data
US 2007/0242637 A1    Oct. 18, 2007

Related U.S. Application Data

(60) Provisional application No. 60/792,018, filed on Apr. 14, 2006.

(51) Int. Cl.
*H04W 4/00*    (2009.01)
(52) U.S. Cl. ......... 370/331; 370/332; 370/333; 370/334
(58) Field of Classification Search .................. None
See application file for complete search history.

(56) References Cited

U.S. PATENT DOCUMENTS

| 5,987,011 | A | * | 11/1999 | Toh | 370/331 |
| 6,832,087 | B2 | | 12/2004 | Gwon et al. | |
| 2005/0243770 | A1 | * | 11/2005 | Devarapalli et al. | 370/331 |
| 2006/0052106 | A1 | | 3/2006 | Park | |

FOREIGN PATENT DOCUMENTS

| KR | 19990086287 | | 12/1999 |
| KR | 20060021789 | A | 3/2006 |

OTHER PUBLICATIONS

El Malki et al., "Low Latency Handoffs in Mobile Ipv4" IETF Standard-Working-Draft. Internet Engineering Task Force, IETF, CH, vol. mobileip, No. 10, Jul. 2005, XP15040991.
International Search Report and Written Opinion—PCT/US2007/066667, International Search Authority—European Patent Office—Sep. 13, 2007.
European Search Report—EP11001823—Search Authority—Munich—Apr. 19, 2011.

* cited by examiner

*Primary Examiner* — Kamran Afshar
*Assistant Examiner* — Sayed T Zewari
(74) *Attorney, Agent, or Firm* — Kam T. Tam

(57) ABSTRACT

Embodiments describe mobility management utilizing neighbor discovery and at least two pseudo wires. When a wireless device desires to handoff to a detected access router, such handoff may not be configured until such time as a current access router receives routing information of the target access router. In order to minimize handoff time, communication between the target access router and the wireless device can be through the current access router utilizing least two pseudo wires. Bidirectional neighbor discovery and create is conducted by the access routers allow subsequent wireless devices to automatically handoff between the access routers.

34 Claims, 16 Drawing Sheets

PSEUDO WIRES FOR MOBILITY MANAGEMENT

CROSS-REFERENCE

This application claims the benefit of U.S. Provisional Application Ser. No. 60/792,018, filed Apr. 14, 2006, entitled "METHODS AND APPARATUS FOR MOBILITY MANAGEMENT," the entirety of which is incorporated herein by reference.

BACKGROUND

I. Field

The following description relates generally to communication systems and more particularly to handovers between access routers.

II. Background

Communication systems can include a multitude of access nodes through which end nodes (e.g., mobile devices) are coupled to a network. End nodes typically communicate with access nodes (e.g., access router) directly through established connections. Such communication systems rely on a bidirectional communications link between the end node and the access node to support two-way communication between the nodes. In such systems, the end node may not know the network layer address of a target destination access node but may be aware of information it can receive over broadcast channels, which can include physical layer identifiers that are normally not utilized for message routing. This approach results in handoff delays and packet loss when the end node is only able to maintain a single bidirectional communications link at a time.

Access nodes that are serving neighboring geographic cells might be known to each other through manual configuration during which various parameters are configured in an access node corresponding to several of its neighbors. Such configuration can be labor intensive and error prone due to human error and the fact that the network layout of a wireless can change due to network expansion, gradual phased deployment of a system, or even environmental conditions.

In communication systems, it is desirable to provide uninterrupted service when the end node moves between neighboring geographic cells. Such transfer is important for critical data (e.g., voice data) since an interruption can result in quality degradation or dropped voice communications.

To overcome the aforementioned as well as other deficiencies, there is a need to support handovers from a current access node to a target access node where an end node cannot communicate directly with the target access node and is forced to communicate with the target access node through the current access node.

SUMMARY

The following presents a simplified summary in order to provide a basic understanding of some aspects of the disclosed embodiments. This summary is not an extensive overview and is intended to neither identify key or critical elements nor delineate the scope of such embodiments. Its sole purpose is to present some concepts of the described embodiments in a simplified form as a prelude to the more detailed description that is presented later.

In accordance with one or more embodiments and corresponding disclosure thereof, various aspects are described in connection with utilizing L2TPv3 (Layer 2 Tunneling Protocol Version 3) pseudo wires to encapsulate signaling and user traffic between base stations in an Internet Protocol (IP) architecture.

According to an embodiment is a method for mobility management. The method includes receiving a neighbor resolution failure in response to a handoff request to a target access router, establishing a CCP link with the target access router, and initiating a new neighbor alert between a current access router and the target access router.

In accordance with another embodiment is an apparatus that facilitates mobility management. The apparatus includes a processor that configures a packet header for a handoff request, the packet header includes a source address and a destination address that correspond with the address of a first access router. The apparatus also includes a transmitter that transmits the configured packet header to the first access router in response to a neighbor resolution failure received from a second access router.

In accordance with another embodiment is an apparatus for facilitating a handoff between two access routers. The apparatus includes a means for receiving a signal from a first access router and a means for transmitting a first handoff request that includes an address of the first access router. Also included is a means for initiating a neighbor discovery between the first access router and a second access router and a means for communicating with the first access router though at least two pseudo wires.

Still another embodiment is a computer-readable medium having stored thereon computer-executable instructions for mobility management. The instructions include recognizing a target access beacon transmitted from a target access router and requesting a first handoff to the target access router. The instructions also include sending a second handoff request upon receipt of a failure to the first handoff request and initiating a neighbor discovery between the target access router and a current access router.

Another embodiment is a processor that executes computer-executable instructions for mobility management. The instructions include responding to a neighbor resolution failure with a handoff request and initiating a neighbor discovery between a first access router and a second access router in part by the handoff request.

In accordance with another embodiment is a method for mobility management. The method includes receiving a new neighbor discovery create message and sending an acknowledgment in reply to the new neighbor create message. The method further includes setting up a first L2TP connection and a second L2TP connection with the target access router in response to a new neighbor alert request.

In accordance with another embodiment is an apparatus that facilitates handoff of a wireless terminal. The apparatus includes a memory that stores information related to neighboring access routers, a receiver that receives a handoff request from a wireless terminal, and a processor that searches the stored information and responds to the handoff request.

Still another embodiment is an apparatus that facilitates mobility management. The apparatus includes a means for creating an internet protocol encapsulation to send information and a means for utilizing at least two pseudo wires for sending the information.

In still another embodiment is a computer-readable medium having stored thereon computer-executable instructions for mobility management. The instructions include receiving from a wireless terminal a new neighbor discovery create message and sending an acknowledgment in reply to the new neighbor create message. The instructions further include exchanging information with a neighbor access router in response to the new neighbor create message and setting up a first L2TP connection and a second L2TP connection with the target access router In accordance with another embodiment is a processor that executes computer-executable instructions for handoff between access routers. The instructions include sending information to a first access router with internet protocol encapsulation and utilizing at least two pseudo wires to send the information.

Still another embodiment is a method for mobility management. The method includes receiving a new neighbor alert from a wireless terminal and requesting a neighbor discovery create from an access router identified in the new neighbor alert. The method further includes receiving an acknowledgment of the requested neighbor discovery create from the access router and communicating with the wireless terminal through a first link and a second link established by the access router.

In accordance with another embodiment is an apparatus that facilitates mobility management. The apparatus includes a processor that initiates a neighbor discovery create in response to a new neighbor alert received from an access terminal and a memory that stores information related to a response to the neighbor discovery create.

Still another embodiment is an apparatus that facilitates handoff between access routers. The apparatus includes a means for transmitting a beacon signal and a means for receiving a handoff request in response to the beacon signal. Also included is a means for initiating a new neighbor discover and a means for exchanging routing information with a neighbor access router.

In accordance with another embodiment is a computer-readable medium having stored thereon computer-executable instructions for mobility management. The instructions include receiving from a wireless terminal a new neighbor alert and requesting a neighbor discovery create from an access router identified in the new neighbor alert. The instructions further include receiving an acknowledgment of the requested neighbor discovery create from the access router and communicating with the wireless terminal through a first link and a second link established by the access router.

In accordance with another embodiment is a processor that executes computer-executable instructions for mobility management. The instructions included transmitting a beacon signal and receiving a handoff request in response to the beacon signal. The instructions further include initiating a new neighbor discover and exchanging routing information with a neighbor access router.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
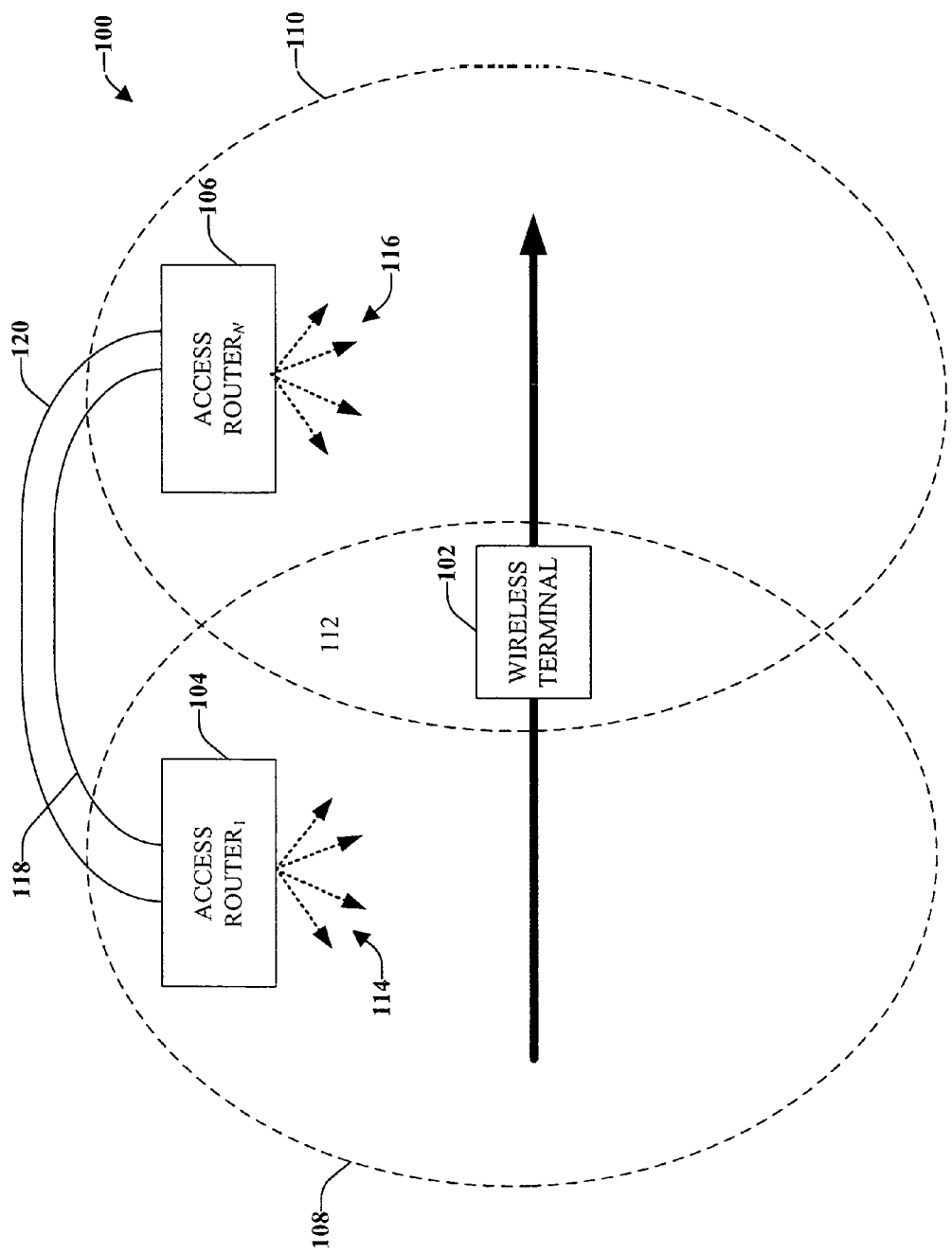
FIG. 1 illustrates a block diagram of a wireless communication system that facilitates handoff utilizing pseudo wires.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a user device. A user device can also be called a system, a subscriber unit, subscriber station, mobile station, mobile device, remote station, access point, base station, remote terminal, access terminal, handset, host, user terminal, terminal, user agent, or user equipment. A user device can be a cellular telephone, a cordless telephone, a Session Initiation Protocol (SIP) phone, a wireless local loop (WLL) station, a Personal Digital Assistant (PDA), a handheld device having wireless connection capability, or other processing device(s) connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . )

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

With reference now to the drawings, FIG. 1 illustrates block diagram of a wireless communication system 100 that facilitates handoff utilizing pseudo wires. System 100 includes a wireless device 102 that can communicate wirelessly with one or more access router, labeled Access Router$_1$ 104 and Access Router$_N$ 106, wherein N can be any integer greater than or equal to one. An access router can be a base station, a packet data serving node (PDSN), and/or a gateway general packet radio services (GPRS) support node.

Each access router 104, 106 has a corresponding geographic range or cell 108, 110. Neighboring cells 108, 110 can overlap slightly as indicated by cell boundary region 112. Such an overlap can provide the potential for wireless device 102 to recognize a beacon signal 114, 116 sent by each access router 104, 106. Beacon signal 114, 116 can include an LLC identifier as well as other information relating to access router 104, 106.

As wireless device 102 moves from cell 108 to cell 110, as indicated by arrow, wireless device 102 receives beacon 116 sent by access router 106. Wireless device 102 may desire to handoff from access router 104 to access router 106. However, if access routers 104, 106 cannot identify each other, a handoff cannot be performed and wireless device 102 cannot communicate correctly with the target access router 106. Therefore, wireless device 102 is forced to communicate to access router 106 through access router 104. To transport signaling and traffic between access routers 104, 106, pseudo wires are created. A first pseudo wire can be created for LLC frames and a second pseudo wire can be created for IP communications. In such a manner, wireless device 102 communicates to access router 106 through access router 104 until direct communication can be established, such as through a handoff.

Figure 2:
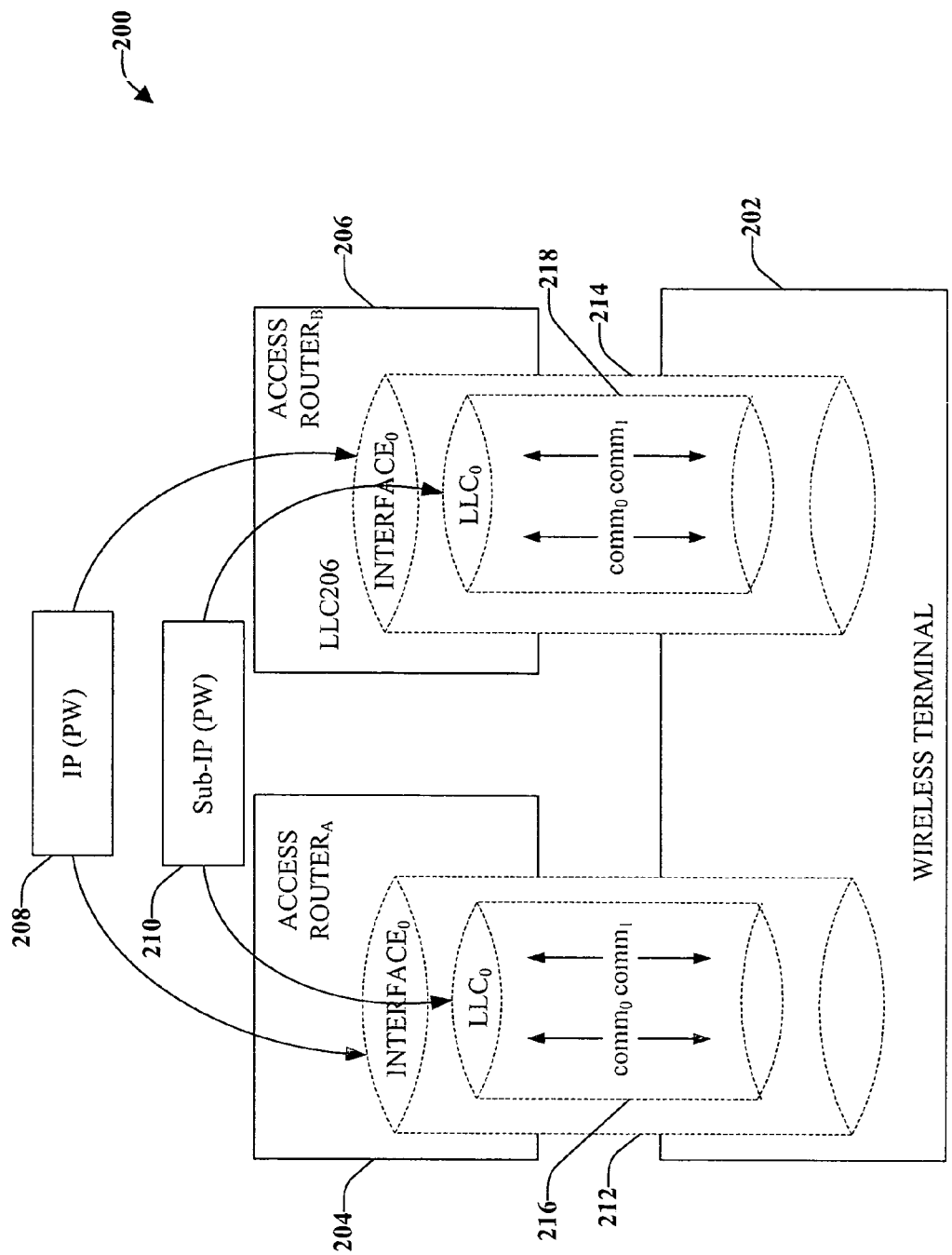
FIG. 2 illustrates a system model used to encapsulate and decapsulate messages between to access routers in accordance with the various embodiments presented herein.

FIG. 2 illustrates a system model 200 used to encapsulate and decapsulate messages between access routers in accordance with the various embodiments presented herein. System 200 includes a wireless terminal 202, a first access router (Access Router$_A$) 204, and a second access router (Access Router$_B$) 206. For purposes of explanation, wireless terminal 202 is in direct communication with Access Router$_A$ 204 (current access router) and would like to handoff to Access Router$_B$ 206 (target access router). Each access router 204, 206 can include respective interfaces 212, 214 and respective LLC entities 216, 218.

Wireless terminal 202 can recognize the presence of target access router 206 through a beacon signal which are sent (periodically or continuously) by access routers to notify wireless devices within the vicinity (e.g., within the access router geographic cell) of the availability of access router. The beacon signal can include an LLC as well as other information relating the access router.

Wireless terminal, having detected the beacon of target access router 206, sends a handoff request to current access router 204. If current access router 204 does not recognize target access router after searching for information in, for example, a look-up table of access routers maintained in a memory a neighbor resolution failure is sent to wireless terminal.

After receiving such a failure, wireless terminal can initiate a neighbor discovery and a new neighbor alert between access routers 204, 206. The wireless terminal 202 can infer that access router 204 and 206 are neighbors based on receiving beacon signals from each access router 204, 206 at substantially the same time or in substantially the same geographic region.

At least two L2TPv3 pseudo wires can be used to encapsulate signaling and user traffic between access routers 204, 206 in an IP architecture. Such wires can support expedited handovers when wireless terminal 202 cannot communicate directly with the new access router (access router$_B$ 206) and is forced to communicate with the new access router through the current one (access router$_A$ 204). Two pseudo wires are utilized because the sending and receiving entities are different for each type of wire.

A first L2TPv3 pseudo wire 208 can be for IP communications. To support handover between access routers 204, 206 wireless terminal 202 needs to anticipate its movement and perform several tasks with the new access router 206 through the current access router 204. These interactions involve sending mobility management protocol (MMP), connection control protocol (CCP), secure association protocol (SAP), and potentially extensible authentication protocol (EAP) messages to the new access router. These protocols do not run over IP, therefore, there is a need for IP encapsulation in order to send this information over multiple hops. The same reasoning applies to sending already compressed RHCP frames. These messages are sent from the LLC of the current access routers to the LLC of the new access router, and are referred to as LLC frames herein.

A second L2TPv3 pseudo wire 210 can be used to encapsulate and demultiplex full IP packets received at the current access router 204 and either bi-cast or forward the packets to the new access router 206. These packets are sent directly from one of the current access router interfaces 212 to one of the new access router interfaces 214. The access router interface includes identification and composition. These messages will be referred to herein as "IP Packets".

Figure 3:
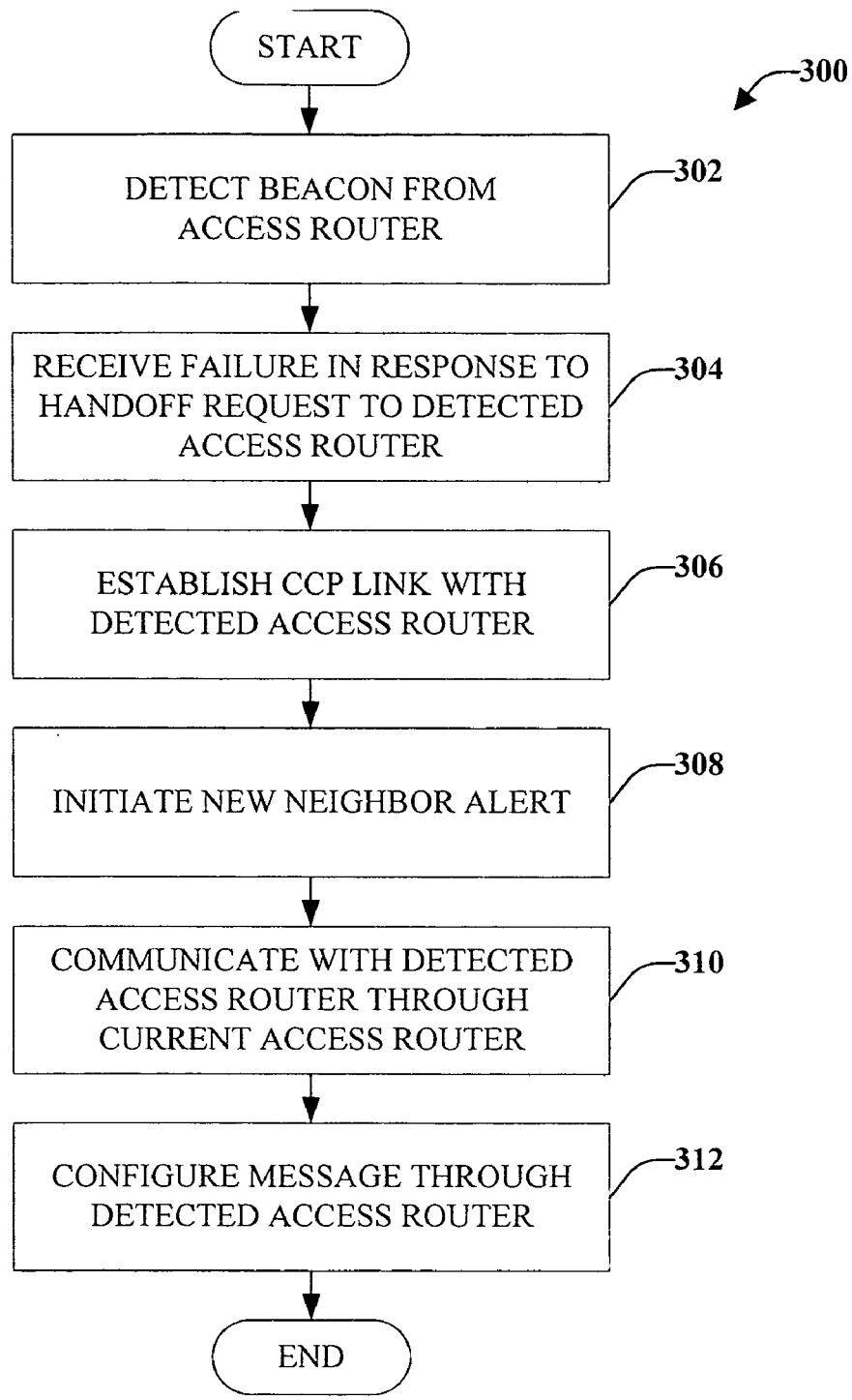
FIG. 3 illustrates a flow chart of a methodology for facilitating handoff utilizing pseudo wires.

FIG. 3 illustrates a flow chart of a methodology for facilitating handoff utilizing pseudo wires. While, for purposes of simplicity of explanation, the methodologies are shown and described as a series of blocks, it is to be understood that the disclosed embodiments are not limited by the number or order of blocks, as some blocks may occur in different orders and/or concurrently with other blocks than what is depicted and described herein. Moreover, not all illustrated blocks may be required to implement the described methodologies. A methodology could alternatively be represented as a series of interrelated states or events, such as in a state diagram. It is to be appreciated that the functionality associated with the blocks may be implemented by software, hardware, a combination thereof or any other suitable means (e.g. device, system, process, component). Additionally, it should be appreciated that the methodologies disclosed throughout this specification are capable of being stored on an article of manufacture to facilitate transporting and transferring such methodologies to various devices.

Method 300 starts, at 302, when a beacon signal is received from an access router. The signal can include an LLC or other identifier for an access router. A wireless device may desire to handoff to the access router (e.g., target access router) based on information received with the beacon, including a communication speed, quality, or other parameters. A request to handoff to the target access router is sent to a current access router. If the current access router does not recognize the target access router, a failure message (e.g., neighbor resolution failure) is received, at 304, in response to the handoff request.

The method 300 continues, at 306, a CCP link is established with the target access router. Establishment of such a link can include sending a second handoff request that includes in the packet header the target access address as both a source address and a destination address. A CCP challenge is received from the target access router in response to the handoff request, which is responded to by the access terminal.

A new neighbor alert is initiated, at 308, which alerts the access routers of the presence of each other. Access routers can communicate and establish communication though exchange of IP encapsulated messages. At least two pseudo wires or tunnels are established between the access routers allowing wireless terminal, at 310, to communicate with the target access router though the current access router until a direct link is established with the target access router, at 312.

The pseudo wires are maintained between access routers and a subsequent wireless device can handoff between access routers in either direction without having to establish new pseudo wires in accordance with the disclosed embodiments. It should be noted that the disclosed embodiments created bidirectional communication, which means that if a handoff is requested from target access router to current access router, the same pseudo wires and techniques can be utilized.

Figure 4:
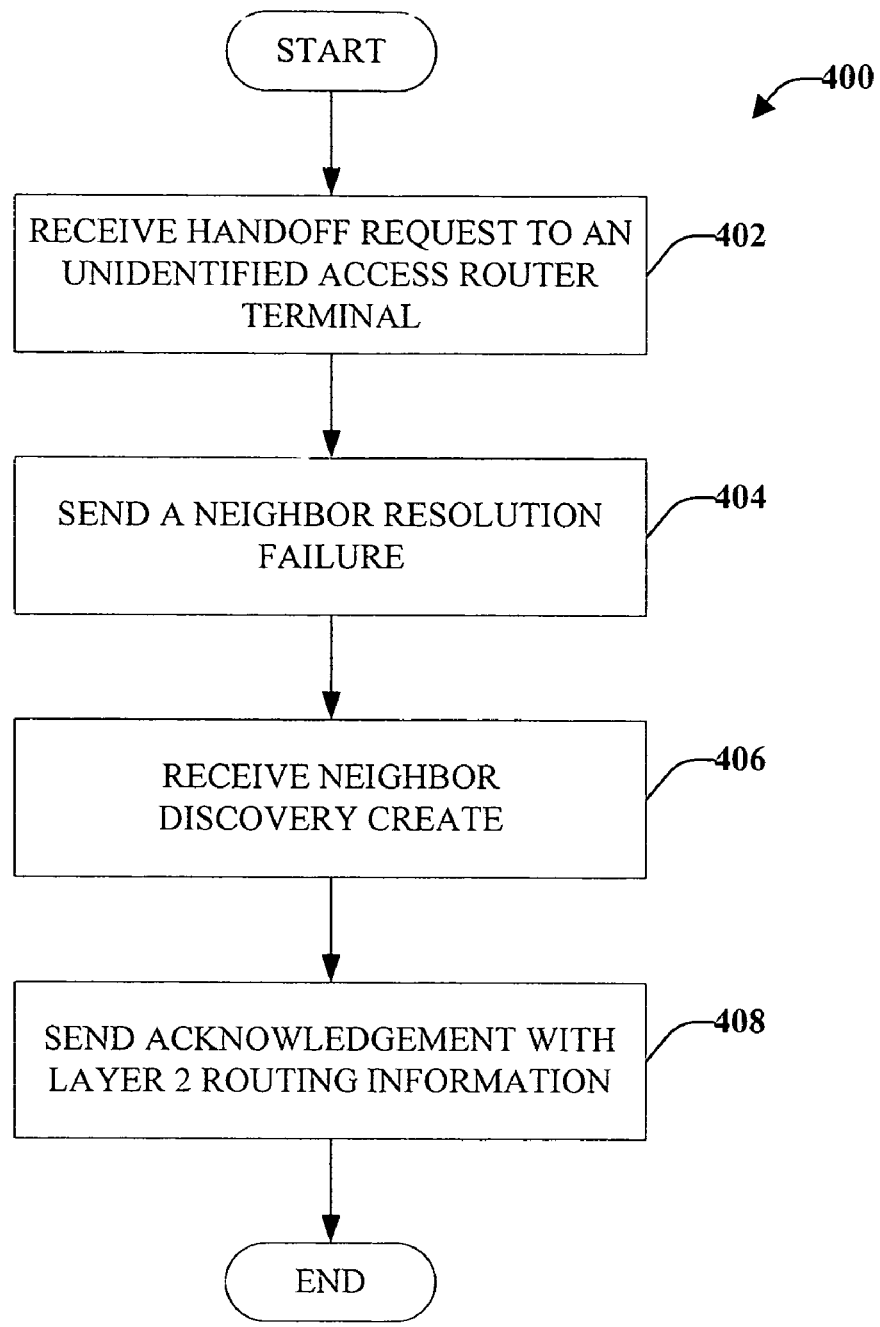
FIG. 4 illustrates another flow chart of a methodology for utilizing the disclosed embodiments.

FIG. 4 illustrates another flow chart of a methodology 400 for utilizing the disclosed embodiments. Method 400 starts, at 402, where a handoff request to an access router (e.g., target access router) is received from a wireless terminal. The current access router can search internal memory, such as a look-up table, for information relating to the target access router (e.g., IP address, LLC, other routing information). If the information is not found, a neighbor resolution failure is sent to wireless terminal, at 404, indicating that the handoff cannot be performed. Wireless terminal can abandon the handoff request, or initiate a CCP link with target access router as previously discussed.

If wireless terminal sends a new neighbor alert, the method continues, at 406, where a neighbor discover create is received. This can include receiving from target access router the routing information necessary to establish a communication link to target access router. If acceptable, at 408, an acknowledgment is sent to the target access router that includes the routing information for the current access router. Thus, establishing bidirectional routing information.

Pseudo wires can be created between the access routers allowing wireless terminal to communicate with target access router, through current access router, until a direct air link can be established with target access router.

Figure 5:
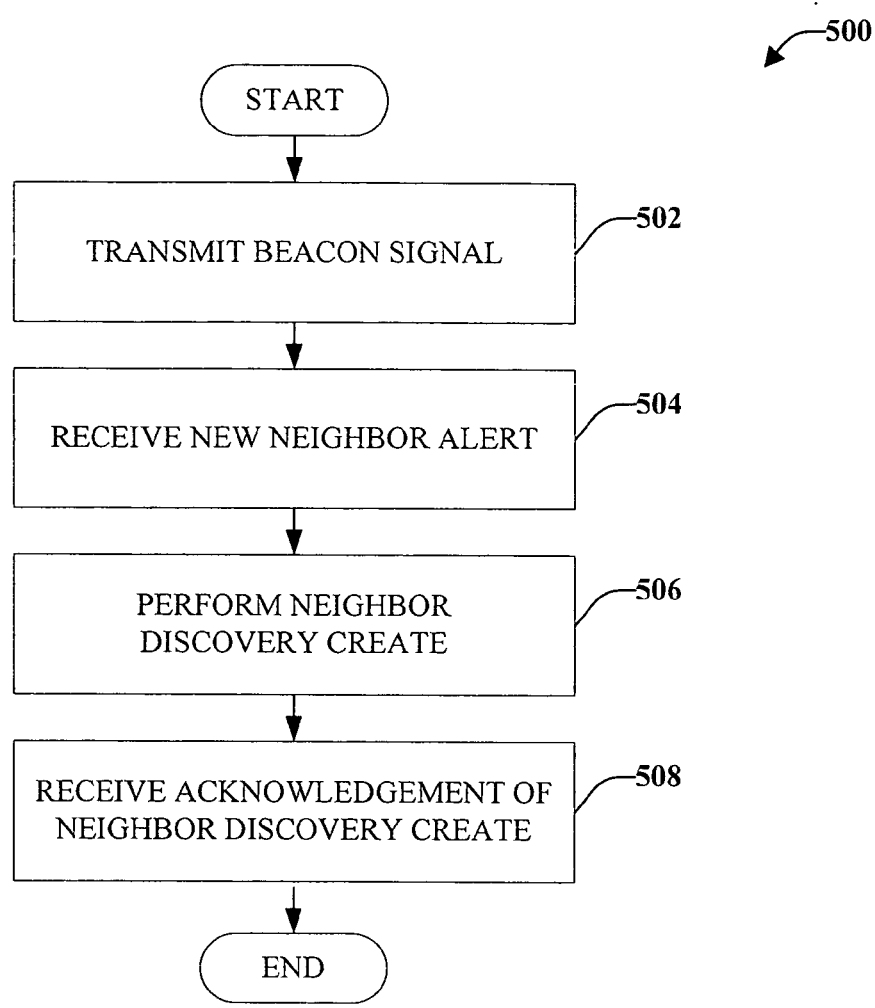
FIG. 5 illustrates a flow chart of a methodology for establishing handoff between a current access router and a target access router.

FIG. 5 illustrates a flow chart of a methodology 500 for establishing handoff between a current access router and a target access router. At 502, a beacon signal is transmitted that includes an LLC of the access router transmitting the beacon. The beacon is intended to be heard by devices within the vicinity, allowing such device to communicate through access router.

At 504, a handoff request can be received from wireless terminal, wherein wireless terminal cannot communicate directly to target access router. Such a handoff request would be received after an initial failure response from a current access router in response to a first handoff request by wireless terminal. The handoff request includes the target access router address as the source address and the destination address in the packet header.

In response to a CCP link established, a new neighbor alert is received at 506. Such a new neighbor alert can be received from a wireless terminal that inferred two or more access routers were neighbors based on beacon signals received from each access router. Neighbor discovery create is performed at 508, wherein target access router and current access router exchange bidirectional routing information. The routing information from the current access router is received, at 510, in an acknowledgement from the current access router in response to the neighbor discover create. The target access router communicates with the wireless terminal through the current access router until a direct air link is established.

Figure 6:
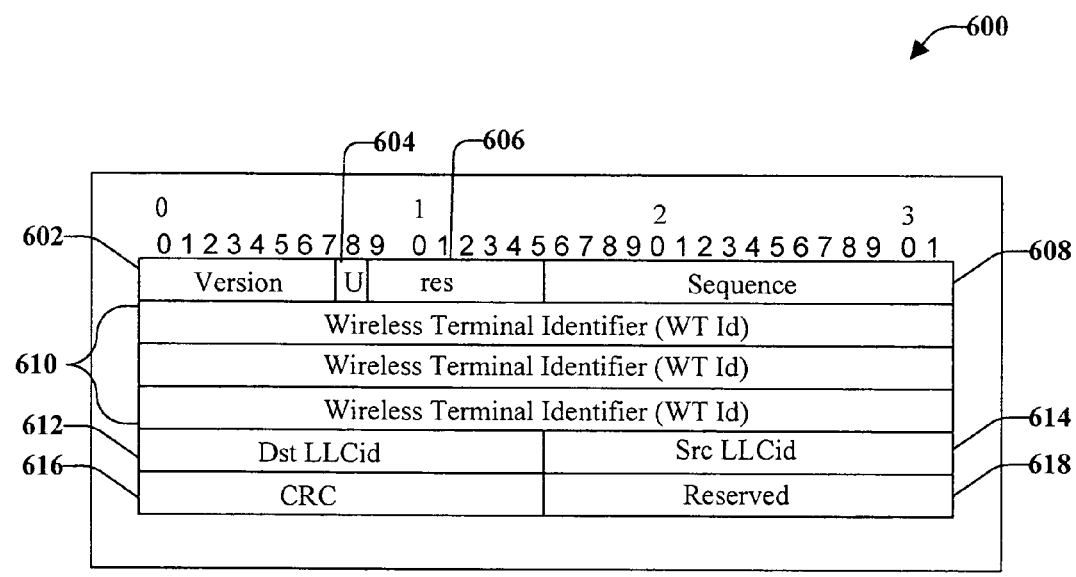
FIG. 6 illustrates an LLC pseudo wire header format utilized with the disclosed embodiments.

FIG. 6 illustrates an LLC pseudo wire header format 600 utilized to carry the LLC frames pseudo wire. The type of pseudo wire is indicated by a session identifier included in the L2TPv3 header and can be utilized as L2TPv3 sub-layer headers. A version 602 description contains the version number of the header. The field may be set to one for this version. Version can be one byte in length and an integer type.

Field 604 is a flag that indicates the direction of the message. When set, it indicates uplink "U", as illustrated. When it is not set, it indicates downlink. Field 604 can be one bit and is an integer type of field. The field res 606 can be reserved for future use. It may be set to zero by the sender and ignored by the receiver. The field res 606 can be 7 bits long and is of the field type integer.

A field sequence number 608 description can be two byes and its field type is integer. This field contains the sequence number for the information forwarded. Sequence number field 608 can be incremented by one each time the sender sends a new message.

A wireless terminal identifier (WT Id) description field 610 can contain a globally unique wireless terminal identifier containing the wireless terminal temporary identifier and a globally unique Mobile Network Server (MNS) identifier. The WT Id field 610 can be field type integer and twelve bytes.

A field that contains an identifier for the destination LLC (Dst LLCid) 612 can be two bytes and an integer type. The identifier contained in the Dst LLCid 612 field is locally unique to the receiver. A field that contains an identifier fro the sending LLC interface (Src LLCid) 614 can be an integer type and have a length of two bytes. The identifier contained in the Src LLCid field 614 is locally unique to the sending interface and is used by the receiver to send responses.

A cyclic redundancy check (CRC) description field 616 covers the L2TPv3 header and the sub-layer header. The CRC field 616 is used to detect transmission errors and is two bytes and its type is integer. Field 618 is reserved for future use and may be set to zero by the sender and ignored by the receiver. It is two bytes in length and an integer field type.

The following will describe a recommended behavior for the access routers in order to process the information exchanged within the tunnel. When sending LLC frames, the sender should select an appropriate session identifier. This protocol uses a 64-bit Cookie filed in the L2TPv3 header. The version field 602 may be set to one. The sequence number field 608 is incremented by one for each message sent. The sequence number field 608 is incremented for all outgoing messages and is not specific to a particular set of messages that are related to a certain wireless terminal. The Dst LLCid field 612 and the Src LLCid field 614 are set according to the values learned when negotiating this session. Field 604 is set to indicate the direction of the message. The CRC is then calculated. The sender may set the CRC field 616 itself to zero while computing the CRC value.

Receiving frames over the LLC pseudo wire includes the access router that receives an encapsulated Sub IP packet first checking the version field 602. If the field 602 is not equal to one, the packet can be silently discarded. If the version is set to one, the receiver computes the CRC field 616 and can set the CRC field 616 itself to zero. If an error is detected, the packet can be silently discarded. Following a successful verification of the CRC, the WT id 610 is used, combined with the sequence number field 608 to detect whether packets arrived out of order. Some protocols (e.g., EAP) expect packets to be received in the same order they were sent. Packet re-ordering depends on the protocol encapsulated and the implementation. The sequence number field 608 is included to allow implementations to take the necessary actions, on a case-by-case basis, when messages arrive out of order. The last received sequence number field 608 for a particular user is stored to allow for packet re-ordering on a per wireless terminal basis.

Figure 7:
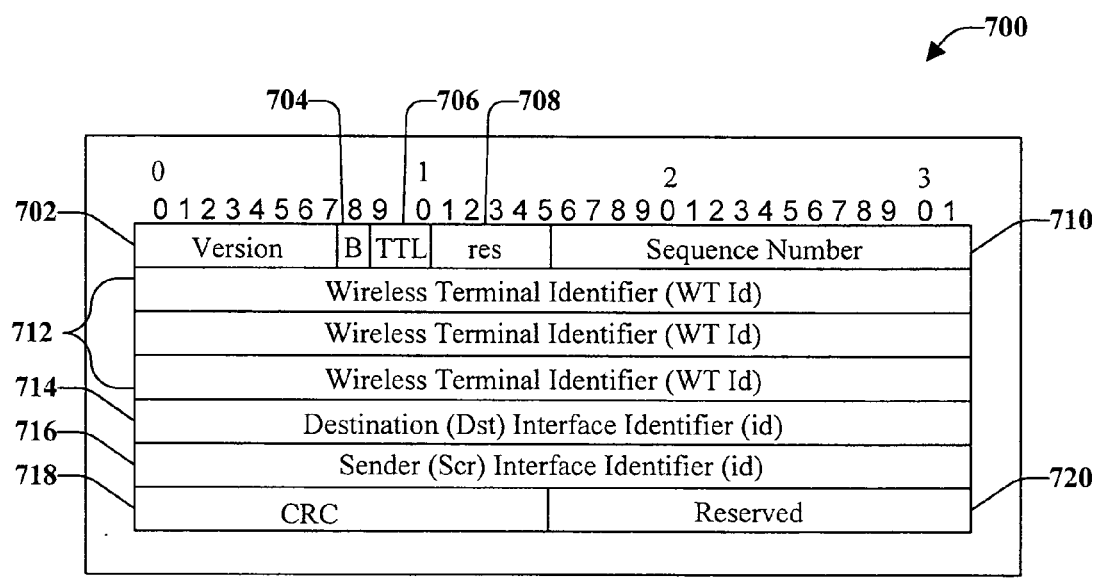
FIG. 7 illustrates a header format for L2TPv3 IP sub-layer utilizing the disclosed techniques.

FIG. 7 illustrates a header format 700 for L2TPv3 IP sub-layer utilizing the disclosed techniques. This header is used for transporting IP packets over the IP session pseudo wire. The type of pseudo wire is indicated by a session identifier included in the L2TPv3 header and can be utilized as L2TPv3 sub-layer headers.

A version description field 702 can be an integer type and one byte in length. The version field 702 contains the version number of the header and may be set to one for this version. Field 704, when set, indicates that the packet was bicast (B) by the sender. This field is an integer and 1 bit in length.

The time to live (TTL) for a packet field 706 can be two bits and an integer. If the TTL field 706 is set to zero, the packet may be discarded. Field 708 is reserved for future use and may be set to zero by the sender and ignored by the receiver. Field 708 is an integer and five bits in length.

A sequence number description field 710 contains the sequence number for the information forwarded. This field can be two bytes and an integer field type. The Sequence Number field 710 is incremented by one each time the sender sends a new message. A wireless terminal identifier (WT Id) field 712 is twelve bytes and an integer field type. WT Id field 712 contains the globally unique wireless terminal identifier containing the wireless terminal temporary identifier and the globally unique MNS identifier.

A destination air link interface identifier (Dst Interface Id) field 714 is an integer field type and four bytes in length. This field may only be locally unique for the receiver and is not necessarily meaningful for the sender. This field may contain an IP address. A field that contains the identifier for the air link interface for the sender is the Src Interface id description field 716. This field is used in responses generated for any received messages. The Src Interface id field 716 is locally unique for the sender and has no meaning for the receiver. This field may contain an IP address. Its field type is integer and it can be four bytes in length.

A CRC field 718 is two bytes in length. The CRC field 718 covers the L2TPv3 header and the sub-layer header. This field is used to detect transmission errors. The field type is integer. Field 720 is reserved for future use and may be set to zero by the sender and ignored by the receiver. The field type is integer and it is two bytes in length.

The following will describe a recommended behavior for the access routers in order to process the information exchanged within the tunnel. When sending IP packets, the sender selects an appropriate session identifier. This protocol can use a 64-bit Cookie field in the L2TPv3 header. The version field 702 may be set to one and the sequence number field 710 is incremented by one for each message sent. It should be noted that the sequence number field 710 is incremented for all outgoing messages and is not specific to a particular set of messages that are related to a certain wireless terminal. The TTL field 706 is set according to routing needs. If the packet were bicast, field 704 may be set indicating a "B" flag. The CRC field 718 is calculated as described above with reference to FIG. 6.

When an IP pseudo wire is received over the IP pseudo wire session, the Version field 704 and the CRC field 718 are verified in a similar manner as that described above. The receiver decrements the TTL field 706 by one and the packet is forwarded to the proper Interface for processing. If the packet were being forwarded from one interface to another, the TTL field 706 is checked to ensure that it is larger than zero. If the TTL field 706 is zero, the packet may be silently discarded.

By using L2TPv3 packet forwarding of user-data from a current access router to a target access router during a handoff; forwarding of Layer 2 (L2) control signaling to achieve expedited handoff, bicasting of user-data to provide macro-diversity in the downlink; and general uplink L2-based routing over IP can be efficiently process. Advantages of using L2TPv3 include utilizing IP networking and routing for packet transport between access routers. Neither L2 routing mechanisms nor transport are required between access routers. The wireless terminal needs to only be aware of L2 addressing and routing. Additional control information is provided in L2TPv3 headers to allow for different user-data treatment and scheduling at the receiving access router. In addition, error detection covers addressing information to ensure packets are not applied to the incorrect wireless terminal.

Figure 8:
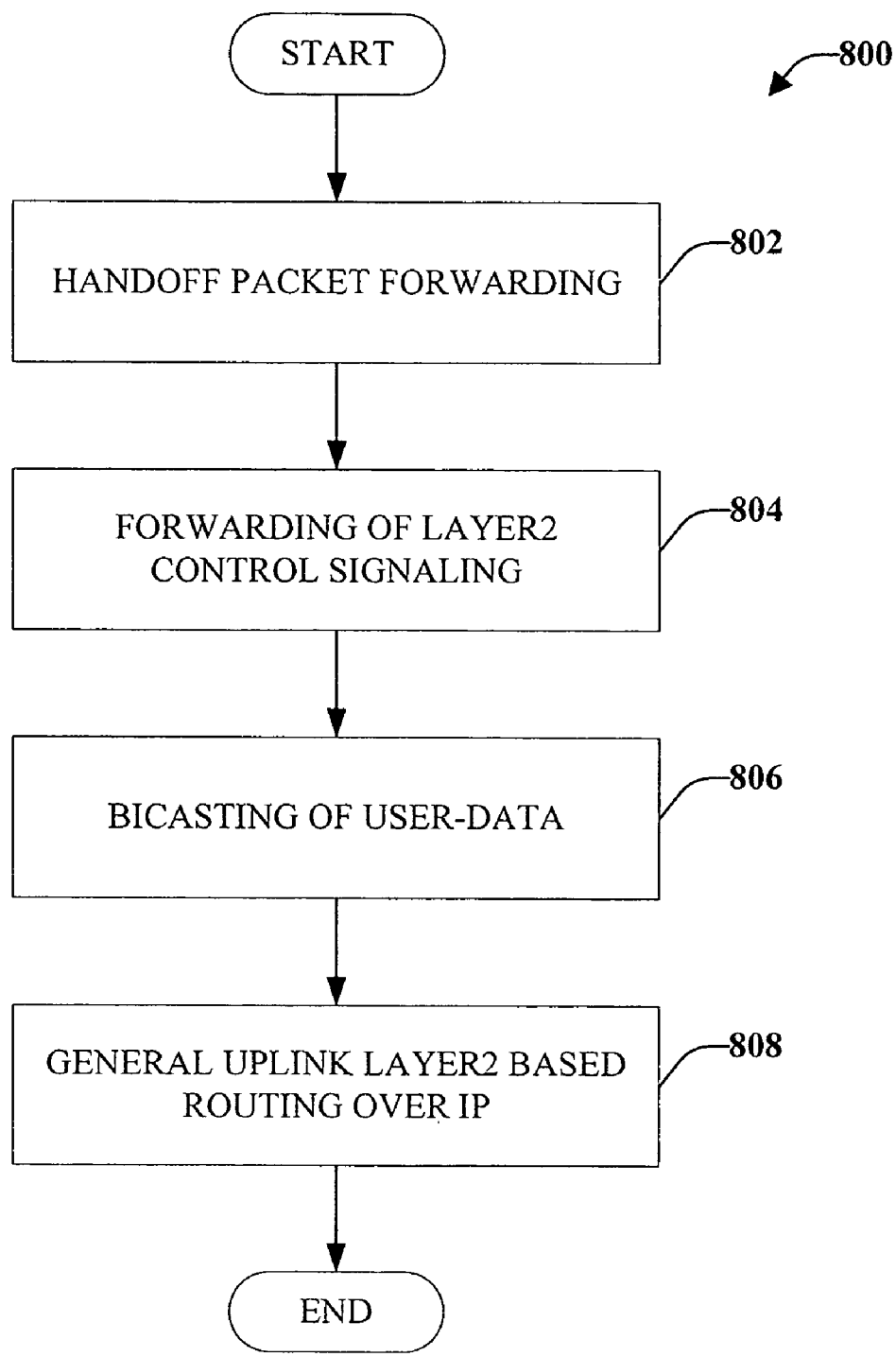
FIG. 8 illustrates a flow chart of a methodology for performing a handoff in accordance with the various embodiments.

FIG. 8 illustrates a flow chart of a methodology 800 for performing a handoff in accordance with the various embodiments. The method 800 starts at 802 with handoff packet forwarding. Based upon receipt of a MIP Binding Update signal from the target access router, buffered packets, and subsequent packets arriving from a Home Agent are encapsulated into L2TPv3 packets and sent to the target access router. The L2TPv3 header includes a wireless terminal identifier and addition information for proper scheduling and treatment at the target access router.

At 804, forwarding of Layer2 control signaling for expedited handoff upon receipt of Layer2 signaling from the wireless terminal is performed. The destination LLCid/Cid is examined in the F-OFDM layer2 header. Based on routing established through neighbor discovery, this signaling is encapsulated into an L2TPv3 packet and forwarded to the proper access router. This allows the handoff signaling to traverse the old uplink for control signaling prior to actually bringing up the new link.

The method 800 continues, at 806, with bicasting of user-data for macro-diversity. To provide robustness and better delivery in the downlink when poor signal-to-noise ration is experienced, some user-data packets may be selectively routed or bicasted down two different downlinks in two different access routers. This can be achieved by replicating and encapsulating the user-data packet in an L2TPv3 packet and sending this packet to the secondary access router.

At 808, general uplink Layer2 based routing over IP is performed. Layer2 signaling or user-data packets can be routed to any geographically near access router by way of IP routing by encapsulating the packet into L2TPv3 and relying on standard IP networking and routing.

In the above methodology 800, a wireless terminal identifier is present allowing the receiving access router to apply the packet to the correct wireless terminal. Other layer2 and layer3 control information can be included in the header for use by the receiver. A cyclic-redundancy check (CRC) is performed to protect the wireless terminal identifier and layer2 and layer3 control information in the L2TPv3 header.

Figure 9:
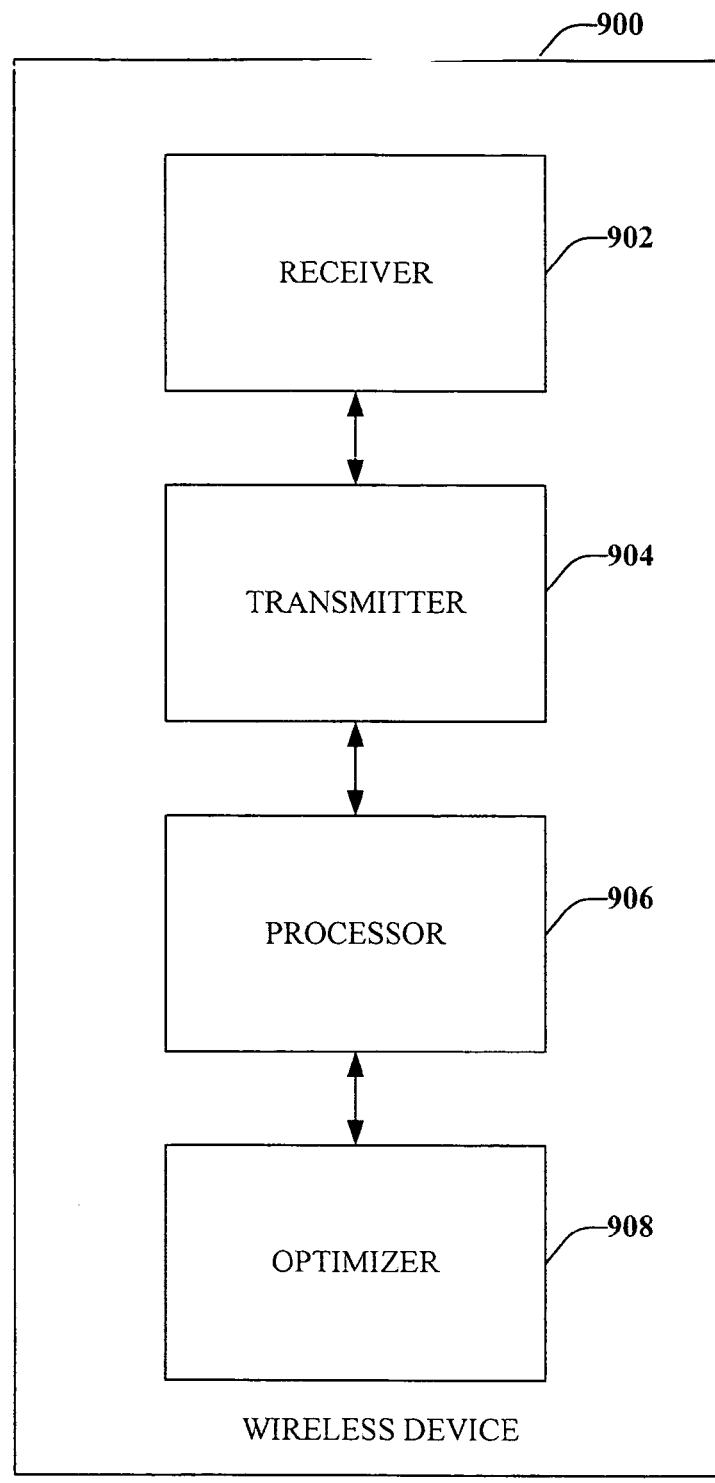
FIG. 9 illustrates a wireless device in accordance with the various embodiments.

FIG. 9 illustrates a wireless device 900 in accordance with the various embodiments. Wireless device 900 can include a receiver 902 that receives information from access routers or other devices. For example, receiver 902 can detect a beacon transmitted by an access router. A transmitter 904 that can convey information to one or more access router and/or device. Such transmitted communication can include handoff requests, communications (e.g., voice, text, data, imagery), as well as other communications.

A processor 906 is also included in wireless terminal 900. Processor can configure a packet header for a handoff request, the packet header includes a source address and a destination address that correspond with the address of a first access router. An optimizer 908 can be configured to establish a CCP link with the first access router to initiate a neighbor discovery between the first access router and the second access router. Optimizer 908 can further specify a handoff state for the apparatus.

Figure 10:
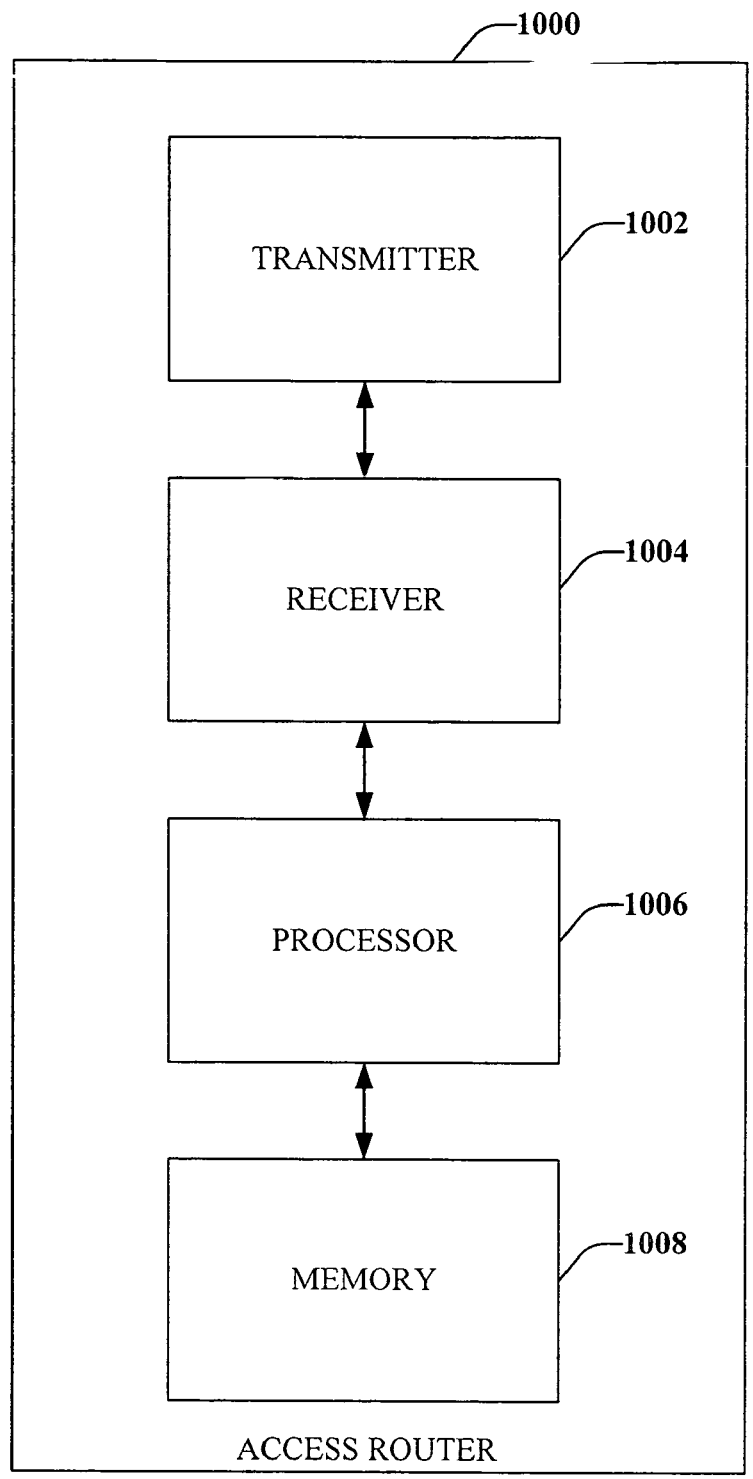
FIG. 10 illustrates an access router in accordance with the various embodiments.

FIG. 10 illustrates an access router 1000 in accordance with the various embodiments. Access router 1000 includes a transmitter 1002, a receiver 1004, a processor 1006, and memory 1008. Transmitter 1002 can be configured to transmit a beacon signal that includes LLC or other access router information. Transmitter 1002 can also be configured to transmit various communications to other access routers or wireless devices. Receiver 1004 can be configured to receive a handoff request, a new neighbor alert, a neighbor discover request, or other information, including communications between wireless devices.

Figure 11:
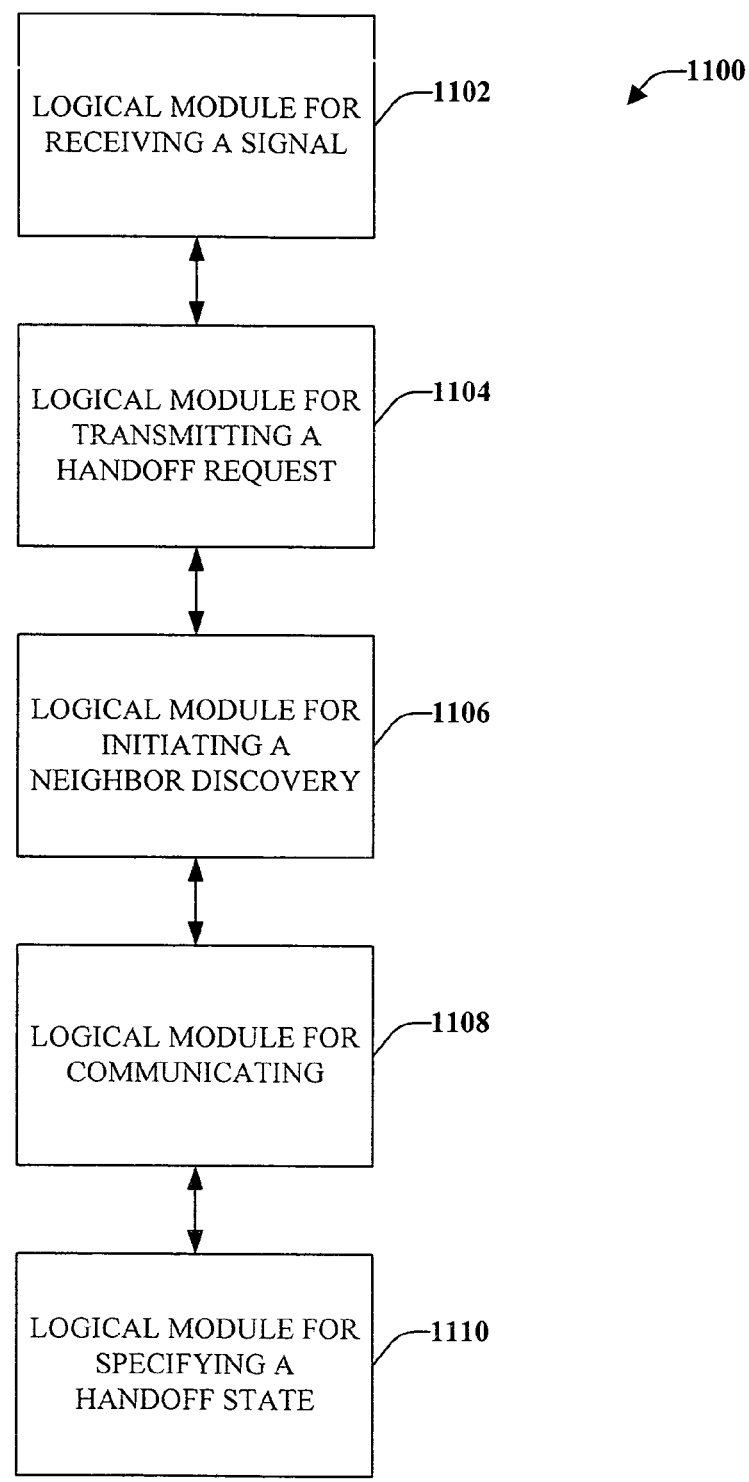
FIG. 11 illustrates a block diagram of an apparatus that facilitates a handoff between at least two access routers.

Processor 1006 can be configured to searches information stored in memory to respond to a handoff request received from a wireless terminal. Processor 1006 can further create at least two pseudo wires to facilitate communication between the wireless terminal and an access router included in the handoff request. A first pseudo wire contains an LLC frame and the second pseudo wires is for at least one IP communication. In accordance with some embodiments, processor 1006 initiates a neighbor discovery create in response to a new neighbor alert received from an access terminal. Memory 1008 can be configured to maintain information relating to access router information exchanged during neighbor discoveries as well as other information provisioned in access router FIG. 11 illustrates a block diagram of an apparatus 1100 that facilitates a handoff between at least two access routers. Apparatus 1100 is represented as functional blocks, which can be functional blocks that represent functions implemented by a processor, software or combination thereof (e.g., firmware).

Included in apparatus 1100 is a logical module 1102 for receiving a signal from a first access router. The first access router can be an access router near apparatus 1100, but not the access router to which apparatus 1100 is in communication. A logical module 1104 for transmitting a first handoff request that includes an address of the first access router can transmit such a request at substantially the same time as the logical module 1102 receives the signal.

A logical module 1106 for initiating a neighbor discovery between the first access router and a second access router is included in apparatus 1100. Also included is a logical module 1108 for communicating with the first access router though at least two pseudo wires. Such wires can be communication paths between the first access router and the second access router. The second access router can be the router in current communication with apparatus 1100. In accordance with some embodiments, logical module 1108 can be configured to communicate directly with the first access router when an air-link is established. When such an air-link is established, the apparatus 1100 may break off the communication with the first access router through the at least two pseudo wires.

In accordance with some embodiments, an optional logical module 1110 for specifying a handoff state for the apparatus 1100 is provided. Examples of a handoff state include an active state, a hold state, and an off state. In such a manner, upon handoff to the first access router, apparatus 1100 can function as specified by the logical module 1110 for specifying a handoff state.

Figure 12:
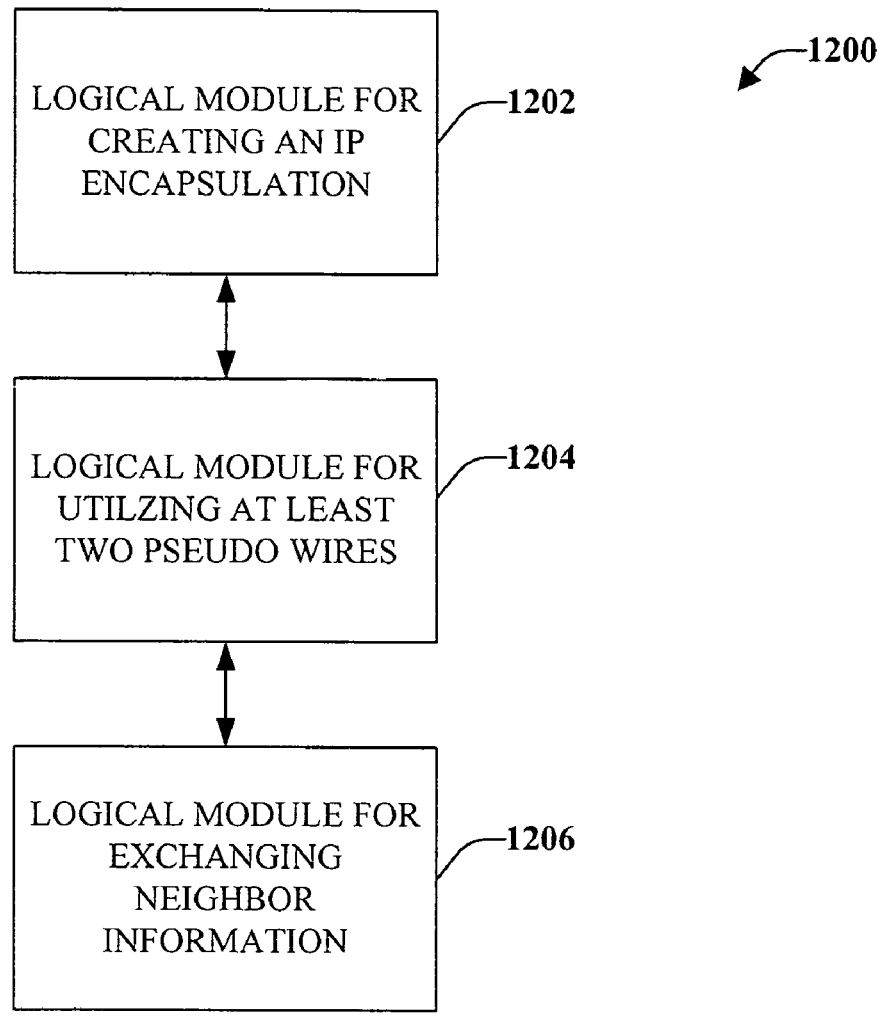
FIG. 12 illustrates a block diagram of an apparatus that facilitates mobility management.

FIG. 12 illustrates a block diagram of an apparatus 1200 that facilitates mobility management. Apparatus 1200 is represented as functional blocks, which can be functional blocks that represent functions implemented by a processor, software or combination thereof (e.g., firmware).

Apparatus 1200 includes a logical module 1202 configured to create an internet protocol encapsulation to send information. Such encapsulation can be included in a header of a message. Also included in apparatus 1200 is a logical module 1204 for utilizing at least two pseudo wires for sending information In accordance with some embodiments, apparatus 1200 includes an optional logical module for exchanging neighbor information with a neighboring access router in response to a new neighbor alert from a wireless device. The wireless device infers that the access routers are neighbors based upon detecting beacons from both access routers.

Figure 13:
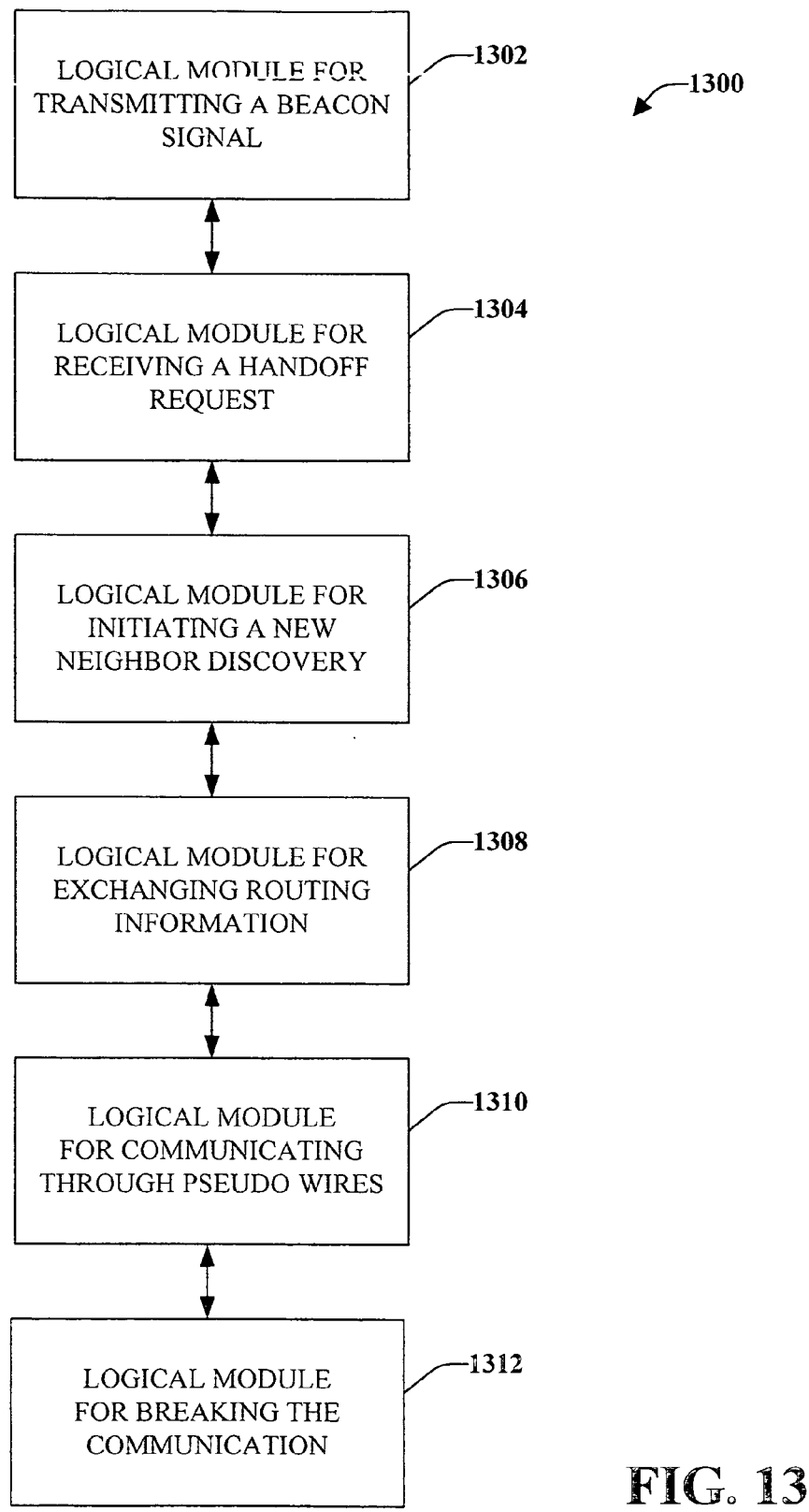
FIG. 13 illustrates an apparatus that facilitates handoff between access routers.

FIG. 13 illustrates an apparatus 1300 that facilitates handoff between access routers. Apparatus 1300 is represented as functional blocks which can be functional blocks that represent functions implemented by a processor, software or combination thereof (e.g., firmware).

Apparatus 1300 includes a logical module 1302 for transmitting a beacon signal. This beacon signal can be heard by wireless devices within the vicinity and such device can make a determination whether to handoff to the access router transmitting the beacon signal. Also included is a logical module 1304 for receiving a handoff request in response to the beacon signal. Such a handoff request can be received from the devices within the vicinity. Also included is a logical module 1306 for initiating a new neighbor discover with, for example, a neighboring access router. A logical module 1308 for exchanging routing information with a neighbor access router is also included in apparatus.

In some embodiments, apparatus 1300 includes a logical module 1310 for communicating with a wireless terminal through at least two pseudo wires. Such a communication can occur through the neighboring access router. Also included can be a logical module 1312 for breaking the communication through the at least two pseudo wires when an air link is established with the wireless terminal. Thus, the communication through the neighboring access router is no longer utilized.

Figure 14:
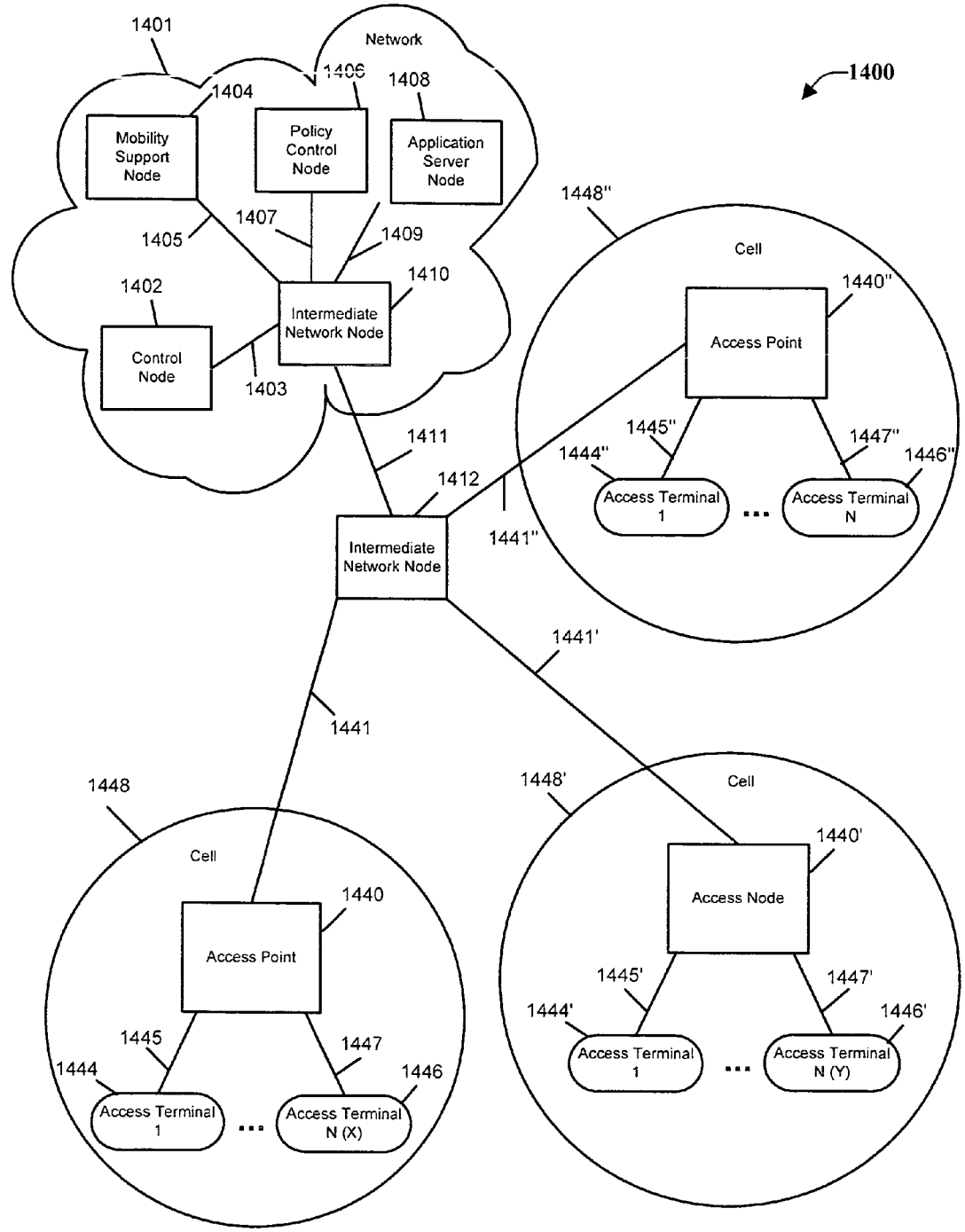
FIG. 14 illustrates a network diagram of an exemplary communications system implemented in accordance with the disclosed embodiments.

FIG. 14 illustrates an exemplary communication system 1400 implemented in accordance with the disclosed embodiments (e.g., a cellular communication network), which comprises a plurality of nodes interconnected by communications links: The network may use Orthogonal Frequency Division Multiplexing (OFDM) signals to communicate information over wireless links. However, other types of signals, such as for example, Code Division Multiple Access (CDMA) signals or Time Division Multiple Access (TDMA) signals, might be used instead. Nodes in the exemplary communication system 1400 exchange information using signals (e.g., messages) based on communication protocols (e.g., the Internet Protocol (IP)). The communications links of system 1400 may be implemented, for example, using wires, fiber optic cables, and/or wireless communications techniques. The exemplary communication system 1400 includes a plurality of access terminals 1444, 1446, 1444', 1446', 1444", 1446", which access the communication system through a plurality of access points 1440, 1440', 1440". The access terminals 1444, 1446, 1444', 1446', 1444", 1446" may be, for example, wireless communication devices or terminals, and the access points 1440, 1440', 1440" may be, for example, wireless access routers or base stations. The exemplary communication system 1400 can also include a number of other nodes 1402, 1404, 1406, 1408, 1410, and 1412, used to provide interconnectivity or to provide specific services or functions.

System 1400 depicts a network 1401 that includes an access control node 1402, a mobility support node 1404, a policy control node 1406, and an application server node 1408, all of which are connected to an intermediate network node 1410 by a corresponding network link 1403, 1405, 1407, and 1409, respectively. In some embodiments, the access control node, (e.g., a Remote Authentication Dial in User Service (RADIUS) or Diameter server) supports authentication, authorization, and/or accounting of access terminals and/or services associated with access terminals. In some embodiments, the mobility support node (e.g., a Mobile IP home agent and/or context transfer server), supports mobility (e.g., handoff) of access terminals between access points, (e.g., via redirection of traffic to/from access terminals and/or transfer of state associated with access terminals between access points. In some embodiments, the policy control node, (e.g., a policy server or Policy Decision Point (PDP)) supports policy authorization for services or application layer sessions. In some embodiments, the application server node (e.g., a Session Initiation Protocol server, streaming media server, or other application layer server) supports session signaling for services available to access terminals and/or provides services or content available to access terminals.

The intermediate network node 1410 in the network 1401 provides interconnectivity to network nodes that are external from the perspective of the network 1401 through network link 1411. Network link 1411 is connected to another intermediate network node 1412, which provides further connectivity to a plurality of access points 1440, 1440', 1440" through network links 1441, 1441', 1441", respectively.

Each access point 1440, 1440', 1440" is depicted as providing connectivity to a plurality of N access terminals (1444, 1446), (1444', 1446'), (1444", 1446"), respectively, by way of corresponding access links (1445, 1447), (1445', 1447'), (1445", 1447"), respectively. In the exemplary communication system 1400, each access point 1440, 1440', 1440" is depicted as using wireless technology (e.g., wireless access links) to provide access. A radio coverage area, (e.g., communications cell, 1448, 1448', 1448" of each access point 1440, 1440', 1400") respectively, is illustrated as a circle surrounding the corresponding access point.

The exemplary communication system 1400 is subsequently used as a basis for the description of various embodiments. Alternative embodiments include various network topologies, where the number and type of nodes (including network nodes, access points, access terminals, as well as various control, support, and server nodes), the number and type of links, and the interconnectivity between various nodes may differ from that of the exemplary communication system 1400.

In various embodiments, some of the functional entities depicted in FIG. 14 may be omitted or combined. The location or placement of these functional entities in the network may also be varied in accordance with the invention.

Figure 15:
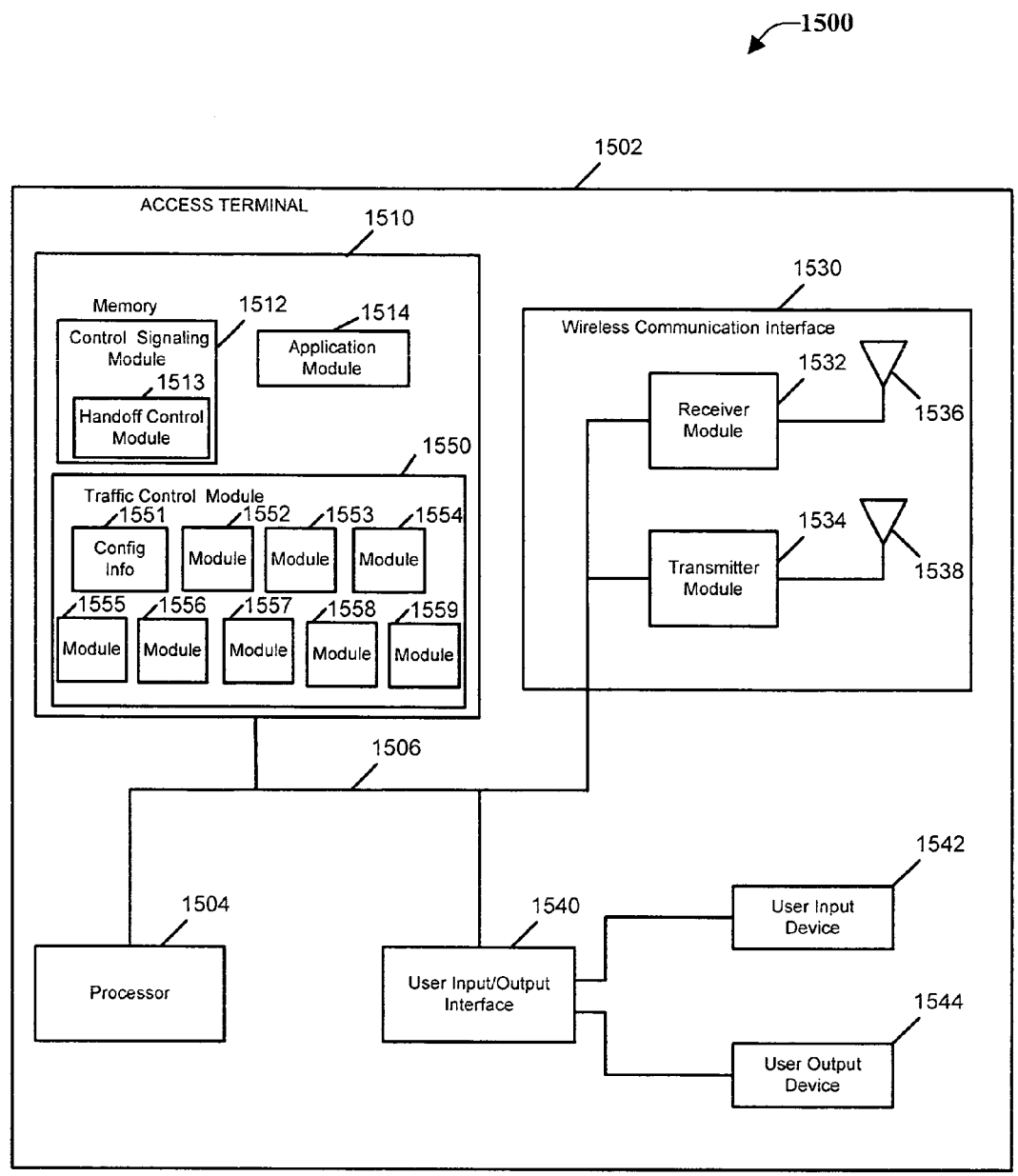
FIG. 15 illustrates an exemplary access terminal implemented in accordance with the various embodiments disclosed herein.

FIG. 15 provides a detailed illustration of an exemplary access terminal 1500 (e.g., wireless terminal) implemented in accordance with the disclosed embodiments. The exemplary access terminal 1500 is a detailed representation of an apparatus that may be used as anyone of the access terminals 1444, 1446, 1444', 1446', 1444", 1446", depicted in the above figure. Access terminal 1500 includes a processor 1504, a wireless communication interface module 1530, a user input/output interface 1540 and memory 1510 coupled by bus 1506. Accordingly, through bus 1506 the various components of the access terminal 1500 can exchange information, signals and data. The components 1504, 1506, 1510, 1530, 1540 of the access terminal 1500 are located inside a housing 1502.

The wireless communication interface module 1530 provides a mechanism by which the internal components of the access terminal 1500 can send and receive signals to/from external devices and network nodes (e.g., access points0. The wireless communication interface module 1530 includes, for example., a receiver module 1532 with a corresponding receiving antenna 1536 and a transmitter module 1534 with a corresponding transmitting antenna 1538 used for coupling the access terminal 1500 to other network nodes (e.g., through wireless communications channels).

The exemplary access terminal 1500 also includes a user input device 1542 (e.g., keypad) and a user output device 1544 (e.g., display) which are coupled to bus 1506 through the user input/output interface 1540. Thus, user input/output devices 1542, 1544 can exchange information, signals and data with other components of the access terminal 1500 via user input/output interface 1540 and bus 1506. The user input/output interface 1540 and associated devices 1542, 1544 provide a mechanism by which a user can operate the access terminal 1500 to accomplish various tasks. In particular, the user input device 1542 and user output device 1544 provide the functionality that allows a user to control the access terminal 1500 and applications (e.g., modules, programs, routines and/or functions) that execute in the memory 1510 of the access terminal 1500.

The processor 1504 under control of various modules (e.g., routines) included in memory 1510 controls operation of the access terminal 1500 to perform various signaling and processing. The modules included in memory 1510 are executed on startup or as called by other modules. Modules may exchange data, information, and signals when executed. Modules may also share data and information when executed. Memory 1510 of access terminal 1500 includes a control signaling module 1512, an application module 1514, and a traffic control module 1550, which further includes configuration information 1551 and various additional modules 1552, 1553, 1554, 1555, 1556, 1557, 1558, and 1559.

The application module 1514 controls processing and communications relating to one or more applications supported by the access terminal 1500. In some embodiments, application module 1514 processing includes tasks relating to input/output of information via the user input/output interfaces 1540, manipulation of information associated with an application, and/or receiving or sending signals (e.g., messages) associated with an application. In some embodiments,—application module 1514 includes state information, (e.g., parameters, status and/or other information) relating to operation of one or more applications supported by the application module 1514. In particular, application module 1514 may include configuration information (e.g., user identification information) and/or parameter settings, and operational information (e.g., information about current processing state, status of pending responses, etc.). Applications supported by the application module 1514 include, for example., Voice over IP (VoIP), web browsing, streaming audio/video, instant messaging, file sharing, gaming, etc.

The control signaling module 1512 controls processing relating to receiving and sending signals (e.g., messages) for controlling operation and/or configuration of various aspects of the access terminal 1500 including, for example, traffic control module 1550 as well as the configuration information 1551 and the various additional modules included therein 1552, 1553, 1554, 1555, 1556, 1557, 1558, and 1559. In some embodiments, the control signaling module 1512 includes state information (e.g., parameters, status and/or other information) relating to operation of the access terminal 1500 and/or one or more signaling protocols supported by the control signaling module 1512. In particular, the control signaling module 1512 may include configuration information (e.g., access terminal identification information and/or parameter settings) and operational information (e.g., information about current processing state, status of pending message transactions, etc.).

Traffic control module 1550 controls processing relating to receiving and sending data information (e.g., messages, packets, and/or frames) through the wireless communication interface module 1530. The exemplary traffic control module includes configuration information 1551 as well as various additional modules 1552, 1553, 1554, 1555, 1556, 1557, 1558, and 1559 that control various aspects of quality of service for packets and/or traffic flows, for example., associated sequences of packet, In some embodiments, the traffic control module 1550 includes state information (e.g., parameters, status and/or other information) relating to operation of the access terminal 1500, the traffic control module 1550, and/or one or more of the various additional modules included therein 1552, 1553, 1554, 1555, 1556, 1557, 1558, and 1559. The configuration information 1551, e.g., parameter settings, determines, affects and/or prescribes operation of the traffic control module 1550 and/or the various additional modules included therein 1552, 1553, 1554, 1555, 1556, 1557, 1558, and 1559. The various additional modules are included, in some embodiments, to perform particular functions and operations as needed to support specific aspects of traffic control. In various embodiments, modules may be omitted and/or combined as needed depending on the functional requirements of traffic control. A brief description of each additional module included in the exemplary traffic control module 1550 follows.

Admission control module 1552 maintains information relating to resource utilization/availability and determines if sufficient resource are available to support the quality of service requirements of particular traffic flows. Uplink scheduler module 1553 controls processing relating to transmission scheduling (e.g., order and/or timing) and allocation of transmission resources (e.g., information coding rate) transmission time slots, and/or transmission power, for data information (e.g., messages, packets, and/or frames) to be sent through the wireless interface module 1530 (e.g., from the access terminal 1500 to an access point).

Uplink PHY/MAC module 1554 controls physical (PHY) layer and Media Access Control (MAC) layer processing relating to sending data information (e.g., messages, packets, and/or frames) through the wireless communication interface module 1530 (e.g., from the access terminal 1502 to an access point). Uplink LLC (ARQ) module 1555 controls Logical Link Control (LLC) layer processing relating to sending data information (e.g., messages, packets, and/or frames) through the wireless communication interface module 1530 (e.g., from the access terminal 1500 to an access point).

Uplink queue management module 1556 maintains information and controls processing relating to storage of data information (e.g., messages, packets, and/or frames, to be sent through the wireless communication interface module 1530 (e.g., from the access terminal 1500 to an access point). Uplink classifier module 1557 controls processing relating to identification of data information, e.g., messages, packets, and/or frames, as belonging to particular traffic flows prior to being sent through the wireless communication interface module 1530 (e.g., from the access terminal 1500 to an access point).

Downlink PHY/MAC module 1558 controls PHY layer and MAC layer processing relating to receiving data information (e.g., packets and/or frames) through the wireless communication interface module 1530 (e.g., from an access point to the access terminal 1500). Downlink LLC (ARQ) module 1559 controls LLC layer processing relating to receiving data information (e.g., packets and/or frames) through the wireless communication interface module 1530 (e.g., from an access point to the access terminal 1500).

Figure 16:
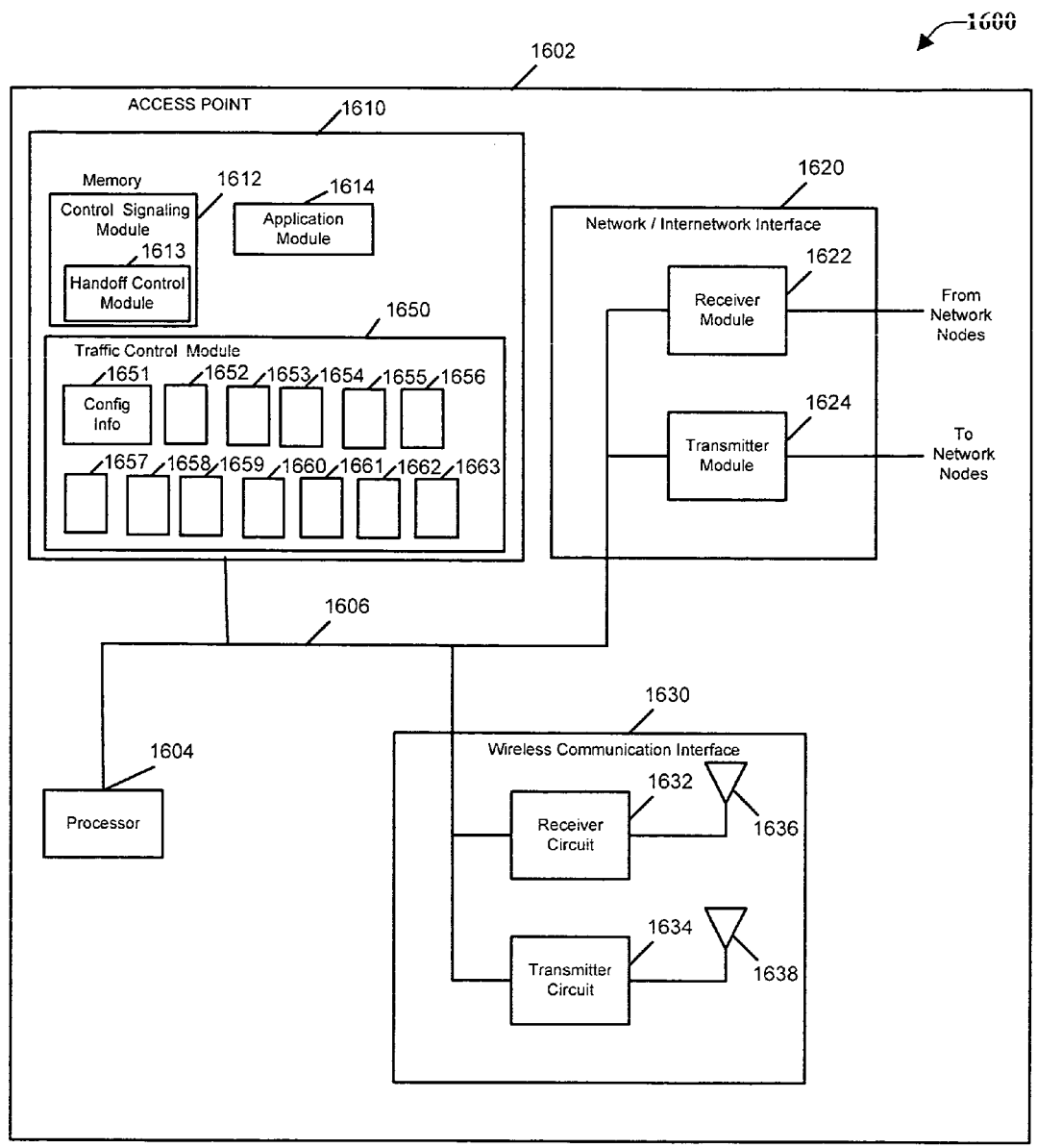
FIG. 16 illustrates an exemplary access point implemented in accordance with the disclosed embodiments.

FIG. 16 provides a detailed illustration of an exemplary access point 1600 implemented in accordance with the various embodiments. The exemplary access point 1600 is a detailed representation of an apparatus that may be used as any one of the access points 1440, 1440', 1440" depicted in FIG. 14. Access point 1600 includes a processor 1604, memory 1610, a network/internetwork interface module 1620 and a wireless communication interface module 1630, coupled by bus 1606. Accordingly, through bus 1606 the various components of the access point 1600 can exchange information, signals and data. The components 1604, 1606, 1610, 1620, 1630 of the access point 1600 are located inside a housing 1602.

The network/internetwork interface module 1620 provides a mechanism by which the internal components of the access point 1600 can send and receive signals to/from external devices and network nodes The network/internetwork interface module 1620 includes, a receiver module 1622 and a transmitter module 1624 used for coupling the node 1600 to other network nodes (e.g., by copper wires or fiber optic lines). The wireless communication interface module 1630 also provides a mechanism by which the internal components of the access point 1600 can send and receive signals to/from external devices and network nodes (e.g., access terminals). The wireless communication interface module 1630 includes, for example, a receiver module 1632 with a corresponding receiving antenna 1636 and a transmitter module 1634 with a corresponding transmitting antenna 1638. The wireless communication interface module 1630 is used for coupling the access point 1600 to other nodes (e.g., through wireless communication channels.

The processor 1604 under control of various modules (e.g., routines) included in memory 1610 controls operation of the access point 1600 to perform various signaling and processing. The modules included in memory 1610 are executed on startup or as called by other modules. Modules may exchange data, information, and signals when executed. Modules may also share data and information when executed. Memory 1610 of access point 1600 includes a control signaling module 1612 and a traffic control module 1650, which further includes configuration information 1651 and various additional modules 1652, 1653, 1654, 1655, 1656, 1657, 1658, 1659, 1660, 1661, 1662, and 1663.

The control signaling module 1612 controls processing relating to receiving and sending signals (e.g., messages) for controlling operation and/or configuration of various aspects of the access point 1600 including, for example, the traffic control module 1650 as well as the configuration information 1651 and the various additional modules included therein 1652, 1653, 1654, 1655, 1656, 1657, 1658, 1659, 1660, 1661, 1662, and 1663. In some embodiments, control signaling module 1612 includes state information (e.g., parameters, status and/or other information) relating to operation of the access point 1600 and/or one or more signaling protocols supported by the control signaling module 1612. In particular, control signaling module 1612 may include configuration information (e.g., access point identification information) and/or parameter settings, and operational information (e.g., information about current processing state), status of pending message transactions, etc.

Traffic control module 1650 controls processing relating to receiving and sending data information (e.g., messages, packets, and/or frames) through the wireless communication interface module 1630. The exemplary traffic control module includes configuration information 1651 as well as various additional modules 1652, 1653, 1654, 1655, 1656, 1657, 1658, 1659, 1660, 1661, 1662, and 1663 that control various aspects of quality of service for packets and/or traffic flows (e.g., associated sequences of packets). In some embodiments, the traffic control module 1650 includes state information (e.g., parameters, status and/or other information), relating to operation of the access point 1600, the traffic control module 1650, and/or one or more of the various additional modules included therein, 1652, 1653, 1654, 1655, 1656, 1657, 1658, 1659, 1660, 1661, 1662, and 1663. The configuration information 1651 (e.g., parameter settings) determines, affects and/or prescribes operation of the traffic control module 1650 and/or the various additional modules included therein 1652, 1653, 1654, 1655, 1656, 1657, 1658, 1659, 1660, 1661, 1662, and 1663. The various additional modules are included, in some embodiments, to perform particular functions and operations as needed to support specific aspects of traffic control. In various embodiments of the present invention, modules may be omitted and/or combined as needed depending on the functional requirements of traffic control. A brief description of each additional module included in the exemplary traffic control module 1650 follows.

Admission control module 1652 maintains information relating to resource utilization/availability and determines if sufficient resources are available to support the quality of service requirements of particular traffic flows. The admission control module 1652 maintains information relating to resource utilization/availability and determines if sufficient resources are available to support the quality of service requirements of particular traffic flows. Resource availability information maintained by the admission control module 1652 includes, for example, packet and/or frame queuing capacity, scheduling capacity, as well as processing and memory capacity needed to support one or more traffic flows.

Uplink scheduler module 1653 controls processing relating to transmission scheduling, (e.g., order and/or timing) and allocation of transmission resources (e.g., information coding rate, transmission time slots, and/or transmission power) for data information, (e.g., messages, packets, and/or frames) to be sent from one or more access terminals to the access point through wireless interface module 1630.

Downlink scheduler module 1654 controls processing relating to transmission scheduling (e.g., order and/or timing) and allocation of transmission resources (e.g., information coding rate, transmission time slots, and/or transmission power) for data information, (e.g., messages, packets, and/or frames) to be sent from the access point 1600 to one or more access terminals through the wireless interface module 1630. The uplink traffic conditioner module 1655 controls processing relating to traffic conditioning (e.g., metering, marking, policing, etc.) for data information (e.g., messages).

Uplink classifier module 1656 controls processing relating to identification of data information (e.g., messages, packets, and/or frames) received through the wireless interface module 1630, for example, from an access terminal to the access point 1600, as belonging to particular traffic flows prior to being processed by uplink traffic conditioner module 1655.

Uplink LLC (ARQ) module 1657 controls LLC layer processing relating to receiving data information (e.g., packets and/or frames) through the wireless communication interface module 1630, for example., from an access terminal to the access point 1600. Uplink PHY/IMAC module 1658 controls PHY layer and MAC layer processing relating to receiving data information (e.g., packets and/or frames) through wireless communication interface module 1630 (e.g., from an access terminal to the access point 1600).

Downlink classifier module 1659 controls processing relating to identification of data information (e.g., messages, packets, and/or frames) as belonging to particular traffic flows prior to being sent through the wireless communication interface module 1630, for example, from the access point 1600 to an access terminal. The downlink traffic conditioner module 1660 controls processing relating to traffic conditioning (e.g., metering, marking, policing, etc.) for data information (e.g., messages, packets, and/or frames) to be sent through the wireless interface module 1630, (e.g., from the access point 1602 to an access terminal).

The downlink queue management module 1661 maintains information and controls processing relating to storage of data information, (e.g., messages, packets, and/or frames) to be sent through the wireless communication interface module 1630, (e.g., from the access point 1600 to an access terminal).

The downlink LLC (ARQ) module 1662 controls LLC layer processing relating to sending data information (e.g., messages, packets, and/or frames) through the wireless communication interface module 1630, (e.g., from the access point 1602 to an access terminal).

The downlink PHY/MAC module 1663 controls PHY layer and MAC layer processing relating to sending data information (e.g., messages, packets, and/or frames, via the wireless communication interface module 1630 (e.g., from the access point 1600 to an access terminal.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A wireless device for facilitating mobility management, comprising:
    a processor for configuring a packet header for a handoff request, wherein the packet header comprises a source address and a destination address, the source address and the destination address both being set to an address of a first access router; and
    a transmitter for transmitting the configured packet header to the first access router in response to a neighbor resolution failure received from a second access router, at the wireless device, indicating that the first access router was not identified by the second access router.

2. The wireless device of claim 1, further comprising:
    a receiver for receiving a beacon signal transmitted from the first access router; and
    an optimizer for establishing a connection control protocol link with the first access router to initiate a neighbor discovery between the first access router and the second access router.

3. The wireless device of claim 1, wherein the transmitter is configured to communicate with the first access router through the second access router through at least two pseudo wires.

4. The wireless device of claim 1, further comprising an optimizer for specifying a handoff state for the apparatus.

5. A wireless device for facilitating a handoff between two access routers, comprising:
    means for receiving a signal from a first access router;
    means for transmitting a first handoff request comprising an address of the first access router;
    means for receiving a failure message from a second access router, at the wireless device, indicating that the first access router was not identified by the second access router:
    means for initiating a neighbor discovery between the first access router and the second access router; and
    means for communicating with the first access router though at least two pseudo wires, each pseudo wire comprising an emulation of a layer two point-to-point or point-to-multipoint link.

6. The wireless device of claim 5, further comprising means for specifying a handoff state.

7. The wireless device of claim 5, wherein the means for communicating is configured to communicate directly with the first access router when an air-link is established.

8. A non-transitory computer-readable medium having stored thereon computer-executable instructions for mobility management, comprising:
    a first instruction set for recognizing a target access beacon transmitted from a target wireless access router;
    a second instruction set for requesting a first handoff to the target wireless access router;
    third instruction set for sending a second handoff request upon receipt of a failure to the first handoff request, the failure received from a current wireless access router, at a wireless device, indicating that the target wireless access router was not identified by the current wireless access router; and
    a fourth instruction set for initiating a neighbor discovery between the target wireless access router and the current wireless access router.

9. The non-transitory computer-readable medium of claim 8, further comprising:
    a fifth instruction set for including in the second handoff request a header comprising an address of the target wireless access router as a destination address and a source address.

10. The non-transitory computer-readable medium of claim 8, further comprising: a sixth instruction set for appending to the second handoff message a handoff state for a wireless terminal, wherein the handoff state is one of an active state, a hold state, or an off state.

11. A processor configured to:
    respond to a neighbor resolution failure with a handoff request, the neighbor resolution failure received from a first wireless access router, at a wireless device, indicate that a second wireless access router was not identified by the first wireless access router; and
    initiate a neighbor discovery between the first wireless access router and the second wireless access router in part by the handoff request.

12. The processor of claim 11, configured to:
    break a link with the first wireless access router when a direct air link communication is available to the second wireless access router.

13. A method for mobility management, comprising:
    means for transmitting a failure message, from a current access router, to a wireless device indicating that a target access router was not identified by the current access router;
    receiving a new neighbor discovery create message;

sending an acknowledgment in reply to the new neighbor discovery create message; and setting up a first layer two point-to-point or point-to-multipoint connection and a second layer two point-to-point or point-to-multipoint connection with the target access router in response to a new neighbor alert request.

14. The method of claim 13, further comprising receiving a new neighbor alert prior to receiving the new neighbor discovery create message.

15. The method of claim 13, further comprising, prior to receiving a new neighbor create message:

receiving at the current access router a request for a handoff from a wireless terminal; and sending a failure message in response to the handoff request.

16. The method of claim 13, wherein the receiving of the new neighbor discovery create message comprises loading a routing of the target access router into the current access router.

17. The method of claim 13, wherein the sending of the acknowledgment comprises responding with layer two routing information of the current access router.

18. The method of claim 13, wherein the first layer two point-to-point or point-to-multipoint connection is for at least one logical link control frame and the second layer two point-to-point or point-to-multipoint connection is for at least one internet protocol communication.

19. An apparatus for facilitating a handoff of a wireless terminal, comprising:

a memory for storing information related to neighboring wireless access routers;

a receiver for receiving a handoff request from a wireless terminal;

a processor for searching the stored information and responding to the handoff request; and a transmitter for transmitting a neighbor resolution failure, from a current wireless access router, to the wireless terminal indicating that the handoff request includes a target wireless access router not stored in memory of the current access router.

20. The apparatus of claim 19, wherein the processor is configured to create at least two pseudo wires to facilitate communication between the wireless terminal and the target wireless access router included in the handoff request.

21. The apparatus of claim 20, wherein a first pseudo wire of the at least two pseudo wires comprises a logical link control frame and a second pseudo wire of the at least two pseudo wires is for at least one interne protocol communication.

22. A processor configured to:

transmit a failure message, from a second access router, to a wireless device indicating that a first access router was not identified by the second access router:

send information to the first access router with internet protocol encapsulation; and utilize at least two pseudo wires to send the information, each pseudo wire comprising an emulation of a layer two point-to-point or point-to-multipoint link.

23. The processor of claim 22, configured to:

respond to a new neighbor alert from the first access router, wherein the responding comprises sending routing information.

24. A method for mobility management being performed by a target access router, comprising:

receiving a new neighbor alert from a wireless terminal for identifying a presence of a current wireless access router;

requesting a neighbor discovery create from the current wireless access router identified in the new neighbor alert;

receiving an acknowledgment of the requested neighbor discovery create from the current wireless access router; and communicating with the wireless terminal through a first link and a second link established between the current wireless access router and the target access router, each of the first link and the second link comprising an emulation of a layer two point-to-point or point-to-multipoint connection.

25. The method of claim 24, further comprising transmitting a beacon signal comprising a logic link control address prior to the receiving of the new neighbor alert.

26. The method of claim 24, wherein the first link is a first layer two point-to-point or point-to-multipoint link connection for at least one logic link control frame and the second link is a second layer two point-to-point or point-to-multipoint link connection for at least one internet protocol communication.

27. The method of claim 24, wherein the communicating with the wireless terminal comprises utilizing layer two routing information.

28. The method of claim 24, wherein the requesting of the neighbor discovery create comprises sending routing information to the current wireless access router.

29. A target wireless access router for facilitating mobility management, comprising:

a processor configured to initiate a neighbor discovery create in response to a new neighbor alert received from an access terminal for identifying a current wireless access router not identified in a memory coupled to the processor, wherein the memory is configured to store information related to a response to the neighbor discovery create, a transceiver configured to communicate with the access terminal through a first link and a second link established between the current wireless access router and the target wireless access router, each of the first link and the second link comprising an emulation of a layer two point-to-point or point-to-multipoint connection.

30. The target wireless access router of claim 29, further comprising a transmitter configured to transmit a beacon signal comprising a logic link control address.

31. A target wireless access router for facilitating handoff between access routers, comprising:

means for transmitting a beacon signal;

means for receiving a handoff request in response to the beacon signal;

means for initiating a new neighbor discover;

means for exchanging routing information with a current wireless access router; and means for communicating with a wireless terminal through at least two pseudo wires established between the current wireless access router and the target wireless access router, each pseudo wire comprising an emulation of a layer two point-to-point or point-to-multipoint link.

32. The target wireless access router of claim 31, further comprising:

means for breaking the communication through the at least two pseudo wires when an air link is established with the wireless terminal.

33. A processor in a target wireless access router for executing computer-executable instructions for mobility management, the instructions comprising:

transmitting a beacon signal;

receiving a handoff request in response to the beacon signal;

initiating a new neighbor discover;

exchanging routing information with a current wireless access router; and communicating with a wireless terminal through at least two pseudo wires established between the current wireless access router and the target wireless access router, each pseudo wire comprising an emulation of a layer two point-to-point or point-to-multipoint link.

34. The processor of claim 33, wherein the instructions further comprise:

breaking the communication through the at least two pseudo wires when an air link is established with the wireless terminal.

* * * * *